United States Patent
Xi et al.

(10) Patent No.: US 11,615,682 B2
(45) Date of Patent: *Mar. 28, 2023

(54) SMOKE DETECTION AND LOCALIZATION BASED ON CLOUD PLATFORM

(71) Applicant: Carrier Corporation, Palm Beach Gardens, FL (US)

(72) Inventors: Jie Xi, Shanghai (CN); Michael J. Birnkrant, Wethersfield, CT (US); Junyang Lin, Shanghai (CN); Jun Hou, Shanghai (CN); Tianyuan Chen, Shanghai (CN); Craig R. Walker, S. Glastonbury, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/058,622

(22) PCT Filed: Jun. 26, 2020

(86) PCT No.: PCT/US2020/039818
§ 371 (c)(1),
(2) Date: Nov. 24, 2020

(87) PCT Pub. No.: WO2020/264294
PCT Pub. Date: Dec. 30, 2020

(65) Prior Publication Data
US 2022/0189273 A1   Jun. 16, 2022

Related U.S. Application Data

(60) Provisional application No. 62/867,570, filed on Jun. 27, 2019.

(51) Int. Cl.
*G08B 21/00* (2006.01)
*G08B 17/107* (2006.01)
(Continued)

(52) U.S. Cl.
CPC .......... *G08B 17/107* (2013.01); *G08B 25/04* (2013.01); *H04L 67/10* (2013.01)

(58) Field of Classification Search
CPC ...... G08B 17/107; G08B 25/04; G08B 21/12; H04L 67/10; G01N 21/53
(Continued)

(56) References Cited

U.S. PATENT DOCUMENTS 5,144,125 A * 9/1992 Carter ................. G08B 17/02
250/227.15
5,280,272 A * 1/1994 Nagashima .......... G08B 17/107
340/630

(Continued)

FOREIGN PATENT DOCUMENTS

CN 207517160 U 6/2018
CN 108429348 A 8/2018
(Continued)

OTHER PUBLICATIONS

Aniedu A.N. et al. "Real-Time Wildfire Monitoring and Alert System Using GSM Technology", IOSR Journal of Mobile Computing & Application, vol. 3, Issue 4 (Jul.- Aug. 2016), pp. 01-10.
(Continued)

*Primary Examiner* — Mark S Rushing
(74) *Attorney, Agent, or Firm* — Cantor Colburn LLP

(57) ABSTRACT

A detection system for measuring one or more conditions within an area. At least one fiber optic cable transmits light wherein the at least one fiber optic cable defines a plurality of nodes arranged to measure the one or more conditions. A control system communicates with the at least one fiber optic cable such that scattered light and a time of flight record is transmitted from the at least one fiber optic cable to the control system. The control system includes a detection algorithm operable to identify a portion of the scattered (Continued)

A = SMOKE PATH - STATIC AIR
B = SMOKE PATH - MAXIMUM VENTILATION light associated with each of the plurality of nodes. When determining an alert, the control system transmits data associated with a presence and magnitude of the one or more conditions at each of the plurality of nodes to a cloud computing environment and, in return, receives a notification based on the data transmitted.

19 Claims, 19 Drawing Sheets

(51) Int. Cl.
G08B 25/04 (2006.01)
H04L 67/10 (2022.01)

(58) Field of Classification Search
USPC .......................................................... 340/630
See application file for complete search history.

(56) References Cited

U.S. PATENT DOCUMENTS

| | | | |
|---|---|---|---|
| 6,822,742 | B1 | 11/2004 | Kalayeh et al. |
| 7,719,433 | B1 | 5/2010 | Billman |
| 8,760,285 | B2 | 6/2014 | Billman et al. |
| 8,823,509 | B2 | 9/2014 | Hyland et al. |
| 8,931,505 | B2 | 1/2015 | Hyland et al. |
| 9,019,111 | B1 | 4/2015 | Sloo et al. |
| 9,661,713 | B2 | 5/2017 | Bhide |
| 9,761,119 | B1 | 9/2017 | Trundle |
| 9,978,251 | B2 | 5/2018 | Gonia et al. |
| 2008/0115949 | A1 | 5/2008 | Li et al. |
| 2016/0033947 | A1* | 2/2016 | Sundar M ............... H04W 4/60 700/275 |
| 2017/0082987 | A1* | 3/2017 | Reddy ..................... H04L 67/12 |
| 2017/0104823 | A1* | 4/2017 | Capps ..................... H04L 67/52 |
| 2018/0151046 | A1 | 5/2018 | Park et al. |

FOREIGN PATENT DOCUMENTS

| | | |
|---|---|---|
| EP | 3321907 A1 | 5/2018 |
| IN | 201721028936 | 9/2017 |
| WO | 2017086981 A1 | 5/2017 |
| WO | 2017133045 A1 | 8/2017 |
| WO | 2017136910 A1 | 8/2017 |
| WO | 2017152279 A1 | 9/2017 |

OTHER PUBLICATIONS

Chao-Ching Ho. "Nighttime Fire/Smoke Detection System Based on a Support Vector Machine. Mathematical Problems in Engineering", vol. 2013, Accepted Aug. 14, 2013, Article ID 428545, 8 pages.
Data Centre Protection. Hybrid IT. Industrial Fire Journal. First Quarter 2018. Retrieved from www.hemmingfire.com pp. 50-52.
Ismail, W. et al. "Smoke Detection Alert System via Mobile Application", Proceedings of the 10th International Conference on Ubiquitous Information Management and Communication, Article No. 34, Jan. 4-6, 2016, Abstract Only, 1 Page.
Pinnacle. Laser Technology Smoke Detector. System Sensor. 2007. 12 Pages.
International Search Report and Written Opinion for Application No. PCT/US2020/039818; dated Dec. 23, 2020; 15 Pages.

* cited by examiner

DEVICES

| | DEVICE NAME | DEVICE ID | LOCATION | STATUS | SENSOR # |
|---|---|---|---|---|---|
| ⚠ | RACK AREA 1 | UTC 1234 | BUILDING C 1 | DISCONNECTED | 3 |
| OK | RACK AREA 2 | UTC 1244 | BUILDING C 1 | CONNECTED | 3 |
| OK | RACK AREA 3 | UTC 1266 | BUILDING C 1 | CONNECTED | 4 |
| OK | RACK AREA 4 | UTC 1400 | BUILDING C 1 | CONNECTED | 2 |
| OK | UPS 1 | UTC 1422 | BUILDING C 2 | CONNECTED | 2 |
| OK | UPS 2 | UTC 1508 | BUILDING C 2 | CONNECTED | 3 |
| OK | HVAC | UTC 1634 | BUILDING C 3 | CONNECTED | 4 |
| OK | BATTERY RACK | UTC 1770 | BUILDING C 3 | CONNECTED | 3 |
| OK | RACK AREA 2 | UTC 1889 | BUILDING C 3 | CONNECTED | 3 |

FIG. 13

SMOKE DETECTION AND LOCALIZATION BASED ON CLOUD PLATFORM

CROSS REFERENCE TO RELATED APPLICATIONS

This application is a US National Stage of International Application No. PCT/US2020/039818 filed Jun. 26, 2020, which claims the benefit of U.S. Application No. 62/867,570, filed on Jun. 27, 2019, which are incorporated herein by reference in their entirety.

BACKGROUND

Embodiments of this disclosure relate generally to a fiber optic detection system for detecting conditions within a space and, more particularly, to a fiber optic detection system to detect and identify a source location of smoke or other airborne pollutants in a space.

Although conventional smoke detection systems and high sensitivity smoke detection systems utilizing airflow can detect the presence of smoke or other airborne pollutants, delays often occur in the detection of the smoke or other airborne pollutants. Also, the conventional smoke detection systems and high sensitivity smoke detection systems utilizing airflow can identify the presence of smoke at the detector but do not identify the source location of the smoke or other airborne pollutants.

High sensitivity smoke detection systems based on fiber optics can detect the presence of smoke or other airborne pollutants in real-time. These known high sensitivity smoke detection systems with fiber optics typically use a primary detection node for whole area detection and a secondary node, commonly referred to as a localization or collimated node, for localization based on a spatial index relative the density of the smoke or the airborne pollutant. Although the spatial and temporal evolution of the pattern of the smoke or pollutant is a way to detect smoke or the pollutant and identify the source location, improved capabilities are needed to identify the type of fire or pollutant and to eliminate nuisances caused by detection of non-hazardous conditions or other conditions that may be distinguishable from conditions that would be required (e.g. by building code or other regulation) or desirable to trigger an alarm.

SUMMARY

According to an embodiment, a computer-implemented method for measuring conditions within multiple areas is provided. The method includes receiving from multiple areas data associated with the presence of one or more conditions at a plurality of nodes within each area, wherein the data received from each area comprises a signal including scattered light and time of flight information associated with a corresponding plurality of nodes. The method also includes determining a status for each area based on the data received from the areas and, in response to determining an alert or an alarm associated with one or more of the areas, transmitting a notification.

In addition to one or more of the features described herein, or as an alternative, further embodiments of the method may include wherein each area corresponds with a different room within a building.

In addition to one or more of the features described herein, or as an alternative, further embodiments of the method may include wherein each area corresponds with a different room within different buildings.

In addition to one or more of the features described herein, or as an alternative, further embodiments of the method may include wherein the data from each area is received from a control system for each area.

In addition to one or more of the features described herein, or as an alternative, further embodiments of the method may include wherein transmitting a notification comprises transmitting at least one of an alert and an alarm.

In addition to one or more of the features described herein, or as an alternative, further embodiments of the method may include wherein transmitting a notification comprises transmitting a source location and at least one of an alert and an alarm.

In addition to one or more of the features described herein, or as an alternative, further embodiments of the method may include wherein transmitting a notification comprises transmitting a source location.

In addition to one or more of the features described herein, or as an alternative, further embodiments of the method may include wherein the data received from each area comprises an accumulated data stream and wherein the accumulated data stream comprises polarization horizontal and vertical laser signals from a primary node and red and green collimating signals from a collimating node.

In addition to one or more of the features described herein, or as an alternative, further embodiments of the method may include wherein the data received from each area comprises an accumulated data stream wherein the accumulated data stream comprises a nuisance discrimination ratio determined by dividing a polarization vertical laser signal and a polarization horizontal laser signal.

In addition to one or more of the features described herein, or as an alternative, further embodiments of the method may include wherein the data received from at least one area comprises a localization spatial index identifying a location of a fire or pollutant within the at least one area.

In addition to one or more of the features described herein, or as an alternative, further embodiments of the method may include displaying a user interface indicating a plurality of devices within one or more facilities and a status for each of the plurality of devices.

In addition to one or more of the features described herein, or as an alternative, further embodiments of the method may include displaying a user interface, wherein the user interface comprises a source location and a status of one or more corresponding devices.

In addition to one or more of the features described herein, or as an alternative, further embodiments of the method may be embodied in a cloud computing environment.

According to another embodiment, a computer program product including a computer readable storage medium having program instructions embodied therewith, the program instructions executable by a computer processor to cause the computer processor to perform a method for conserving energy for measuring conditions within multiple areas, comprising: receiving from multiple areas data associated with the presence of one or more conditions at a plurality of nodes within each area, wherein the data received from each area comprises a signal including scattered light and time of flight information associated with a corresponding plurality of nodes; determining a status for each area based on the data received from the areas; and in response to determining an alert or an alarm associated with one or more of the areas, transmitting a notification.

In addition to one or more of the features described herein, or as an alternative, further embodiments of the computer program product may include wherein transmitting a notification includes transmitting a source location, an alert, and an alarm.

In addition to one or more of the features described herein, or as an alternative, further embodiments of the computer program product may include determining a source location and a plurality of possible fire sources based on the received data.

In addition to one or more of the features described herein, or as an alternative, further embodiments of the computer program product may include indicating a source location and a plurality of possible fire sources based on the received data.

In addition to one or more of the features described herein, or as an alternative, further embodiments of the computer program product may include displaying a user interface indicating a plurality of devices within one or more facilities and a status for each of the plurality of devices.

In addition to one or more of the features described herein, or as an alternative, further embodiments of the computer program product may include displaying a user interface, wherein the user interface comprises a source location and a status of one or more corresponding devices.

In addition to one or more of the features described herein, or as an alternative, further embodiments of the computer program product may be embodied in a cloud computing environment.

BRIEF DESCRIPTION OF THE DRAWINGS

The subject matter, which is regarded as the present disclosure, is particularly pointed out and distinctly claimed in the claims at the conclusion of the specification. The foregoing and other features, and advantages of the present disclosure are apparent from the following detailed description taken in conjunction with the accompanying drawings in which:

FIG. 13 depicts a listing of a plurality of devices and their statuses networked via a cloud computing environment;

The detailed description explains embodiments of the present disclosure, together with advantages and features, by way of example with reference to the drawings.

DETAILED DESCRIPTION

Figure 1:
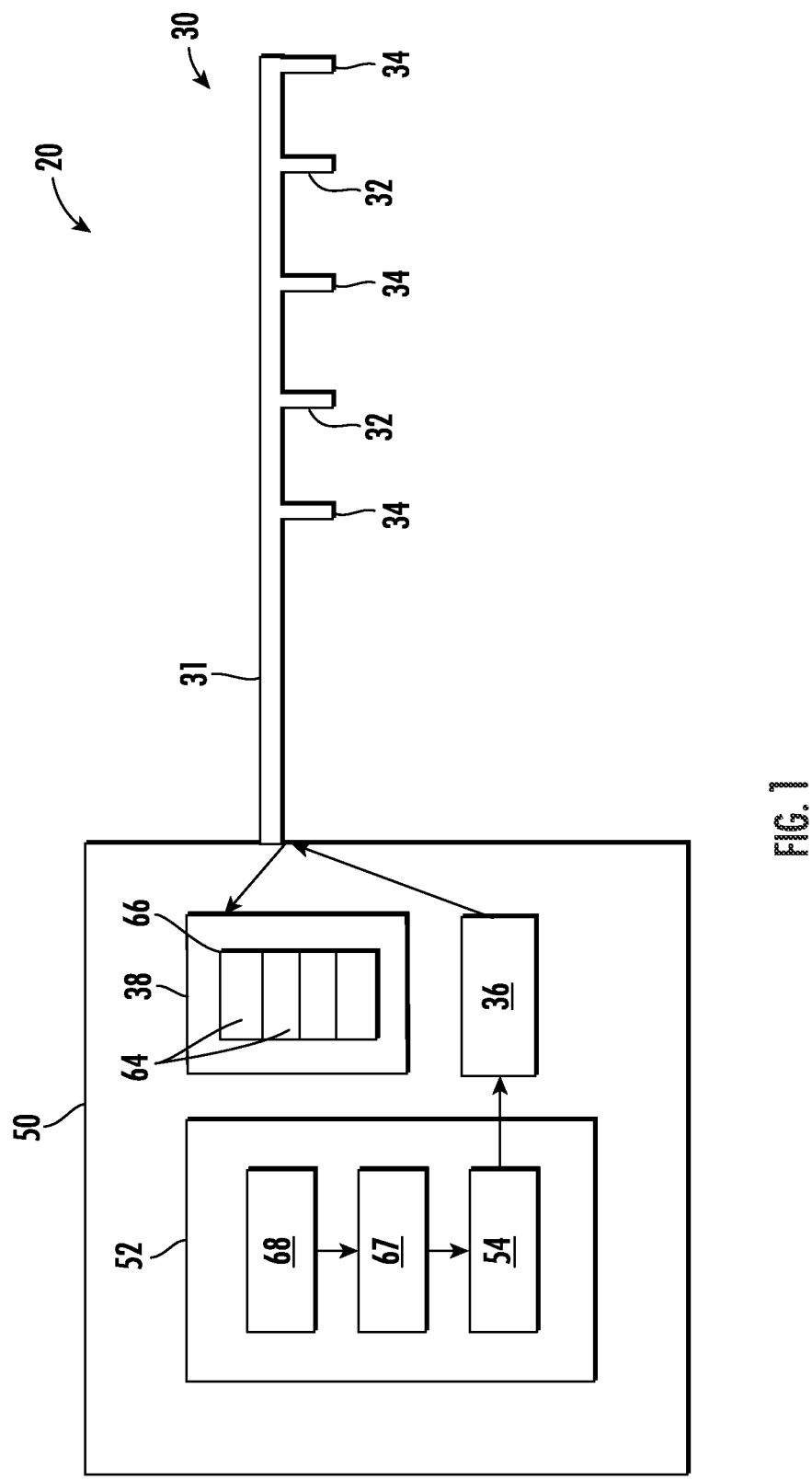
FIG. 1 is a schematic diagram of a detection system according to one or more embodiments.
Figure 2:
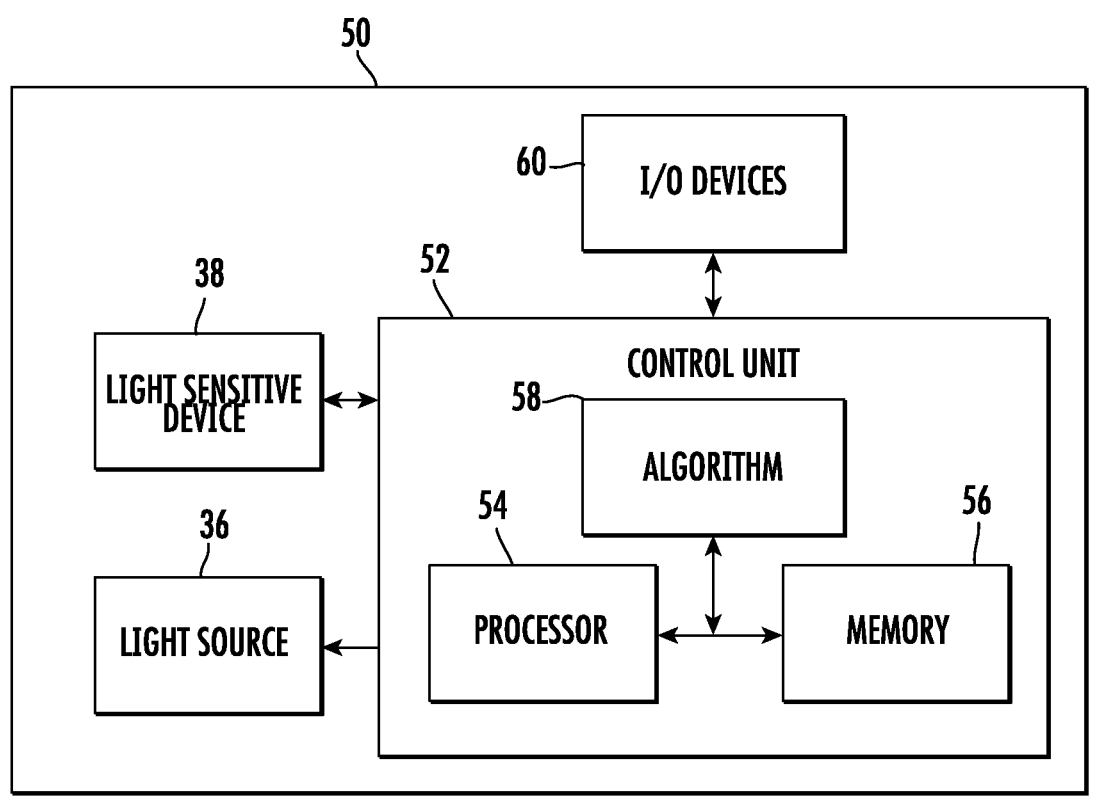
FIG. 2 is a schematic diagram of a control system of the detection system according to one or more embodiments.

Referring now to the FIGS. 1 and 2, a system 20 for detecting one or more conditions or events within a designated area is illustrated. The detection system 20 may be able to detect one or more hazardous conditions, including but not limited to the presence of smoke, fire, temperature, flame, or any of a plurality of pollutants, combustion products, or chemicals. Alternatively, or in addition, the detection system 20 may be configured to perform monitoring operations of people, lighting conditions, or objects. In an embodiment, the system 20 and/or components thereof may operate in a manner similar to a motion sensor, such as to detect the presence of a person, occupants, or unauthorized access to the designated area for example. The conditions and events described herein are intended as an example only and other suitable conditions or events are within the scope of the disclosure.

In addition to smoke or dust, the system 20 may be utilized to monitor or detect pollutants such as volatile organic compounds (VOC's), particle pollutants such as PM2.5 or PM10.0 particles, biological particles, and/or chemicals or gases such as $H_2$, $H_2S$, $CO_2$, $CO$, $NO_2$, $NO_3$, or the like. Multiple wavelengths may be transmitted by a light source 36 to enable simultaneous detection of smoke, as well as individual pollutant materials. The light emitted by light source 36 for biological detection is a subset of the wavelength range from 280 nm to 550 nm. The light source 36 may emit light at one or more wavelengths between 360 nm and 2000 nm for detection of particulates needed to detect smoke, dust and particle pollutants. In some representative illustrations herein red refers to a wavelength range between 580 nm and 1000 nm and green refers to a wavelength range between 375 nm and 580 nm. The light source 36 may be selected to emit light between 1500 nm and 5000 nm to detect chemicals, gases or VOCs. As an example, a first wavelength may be utilized for detection of smoke, while a second wavelength may be utilized for detection of VOC's. Additional wavelengths may be utilized for detection of additional pollutants, and using multiple wavelength information in aggregate may enhance sensitivity and provide discrimination of gas species from false or nuisance sources. In order to support multiple wavelengths, one or more lasers may be utilized to emit several wavelengths. Alternatively, the control system can provide selectively controlled emission of the light. Utilization of the system 20 for pollutant detection can lead to improved air quality in a space as well as improved safety.

The detection system 20 uses light to evaluate a volume for the presence of a condition. In this specification, the term "light" means coherent or incoherent radiation at any frequency or a combination of frequencies in the electromagnetic spectrum. In an example, the photoelectric system uses light scattering to determine the presence of particles in the ambient atmosphere to indicate the existence of a condition or event. In this specification, the term "scattered light" may include any change to the amplitude/intensity or direction of the incident light, including reflection, refraction, diffraction, absorption, and scattering in any/all directions. In this example, light is emitted into the designated area; when the light encounters an object (a person, smoke particle, or gas molecule for example), the light can be scattered and/or absorbed due to a difference in the refractive index of the object compared to the surrounding medium (air). Depending on the object, the light can be scattered in all different directions. Observing any changes in the incident light, by detecting light scattered by an object for example, can provide information about the designated area including determining the presence of a condition or event.

In its most basic form the detection system 20 includes a single fiber optic cable with at least one fiber optic core. The term fiber optic cable includes any form of optical fiber. As examples, an optical fiber is a length of cable that is composed of one or more optical fiber cores of single-mode, multimode, polarization maintaining, photonic crystal fiber or hollow core. Each cable may have a length of up to 5000 m. A node 34 is located at the termination point of a fiber optic cable and is included in the definition of a fiber optic cable. The detection system 20 can include a plurality of nodes 34. Each node 34 is positioned in communication with the ambient atmosphere. A light source 36, such as a laser diode for example, and a light sensitive device 38, such as a photodiode for example, are coupled to the fiber optic cable. A control system 50 of the detection system 20 including a control unit 52, discussed in further detail below, is utilized to manage the detection system operation and may include control of components, data acquisition, data processing and data analysis.

Rather than having a plurality of individual fiber optic cables separately coupled to the control unit 50, the detection system 20 includes a fiber harness 30 as shown in FIG. 1. The detection system 20 may include one or more light sources 36, each of which is coupled to one or more fiber harnesses 30. The fiber harness 30 may be formed by bundling a plurality of fiber optic cables, or the cores associated with a plurality of fiber optic cables, together within a single conduit or sheath for example. However, it should be understood that embodiments where the fiber harness 30 includes only a single fiber optic cable or the cores associated therewith are also contemplated herein.

Structural rigidity is provided to the fiber harness 30 via the inclusion of one or more fiber harness backbones 31. As shown in the FIG. 1, in embodiments where the fiber harness 30 includes a plurality of fiber optic cables, the plurality of fiber optic cables may be bundled together at one or more locations, upstream from the end of each cable. The end of each fiber optic cable, and therefore the end of each core associated with the cable 28, is separated from the remainder of the fiber optic cables at an adjacent, downstream backbone 31 formed along the length of the fiber harness 30. Each of these free ends defines a fiber optic branch 32 of the fiber harness 30 and has a node 34 associated therewith.

The light from the light source 36 is transmitted through fiber optic cable and through the node 34 to the surrounding area. The light interacts with one or more particles indicative of a condition and is reflected or transmitted back to the node 34. A comparison of the light provided to the node 34 from the light source 36 and/or changes to the light reflected back to the light sensitive device 38 from the node 34 will indicate whether or not changes in the atmosphere causing the scattering of the light, such as particles for example, are present in the ambient atmosphere adjacent the node 34. The scattered light as described herein is intended to additionally include reflected, transmitted, and absorbed light. Although the detection system 20 is described as using light scattering to determine a condition or event, embodiments where light obscuration, absorption, and fluorescence is used in addition to or in place of light scattering are also within the scope of the disclosure. Upon detection of a event or condition, it will be possible to localize the position of the event because the position of each node 34 within the system 20 is known, as is the time-of-flight for received light, as explained below.

The control system 50 localizes the scattered light, i.e. identifies the scattered light received from each of the plurality of nodes 34, and an analog-to-digital converter (ADC) converts the localized scattered light to processed signals to be received by the control system 50. The control system 50 may use the position of each node 34, specifically the length of the fiber optic cables associated with each node 34 (recorded within control system 50 when the system 20 is installed) and the corresponding time of flight (i.e. the time elapsed between when the light was emitted by the light source 36 and when the scattered light was received by the light sensitive device 38), to associate different portions of the light signal with each of the respective nodes 34 that are connected to that light sensitive device 38. Alternatively, or in addition, the time of flight may include the time elapsed between when the light is emitted from the node 34 and when the scattered light is received back at the node 34. In such embodiments, the time of flight provides information regarding the distance of the object or particle relative to the node 34.

The detection system 20 may be configured to monitor an area, sometimes referred to as a protected space, such as all or part of a room or building, for example. In an embodiment, the detection system 20 is utilized for areas having a crowded environment, such as a data room housing computer servers and/or other equipment. In such embodiments, a separate fiber harness 30 may be aligned with one or more rows of equipment cabinets, and each node 34 therein may be located directly adjacent to one of the equipment towers within the rows. In addition, the nodes 34 may be arranged so as to monitor specific enclosures, electronic devices, or machinery within the crowded environment. Positioning of the nodes 34 in such a manner allows for earlier detection of a condition as well as localization, which may limit the exposure of the other equipment in the room to the same condition. For example, if a hazardous condition such as overheat, smoke and/or fire were to effect one or more specific pieces of equipment in one or more towers, a node 34 physically arranged closest to the tower and/or closest to the equipment may detect the smoke, fire, temperature, and/or flame. Further, since the location of node 34 is known, suppressive or preventative measures may be quickly deployed in the area directly surrounding the node 34, but not in areas where the hazardous condition has not detected. In another application, the detection system 20 may be integrated into an aircraft, such as for monitoring a cargo bay, avionics rack, lavatory, or another confined region of the aircraft that may be susceptible to fires or other events.

The control system 50 of the detection system 20 is utilized to manage the detection system operation and may include control of components, data acquisition, data processing and data analysis. The control system 50, illustrated in FIG. 2, includes at least one light sensitive device 38, at least one light source, 36, and a control unit 52, such as a computer or microcomputer having one or more processors 54 and memory 56 for implementing one or more algorithms 58 as executable instructions that are executed by the processor 54. The instructions may be stored or organized in any manner at any level of abstraction. The processor 54 may be any type of processor, including a central processing unit ("CPU"), a general purpose processor, a digital signal processor, a microcontroller, an application specific integrated circuit ("ASIC"), a field programmable gate array ("FPGA"), or the like. Also, in some embodiments, memory 56 may include random access memory ("RAM"), read only memory ("ROM"), or other electronic, optical, magnetic, or any other computer readable medium for storing and supporting processing in the memory 56. In addition to being operably coupled to the at least one light source 36 and the at least one light sensitive device 38, the control unit 52 may be associated with one or more input/output devices 60. In an embodiment, the input/output devices 60 may include an alarm or other signal, or a fire suppression system which are activated upon detection of a predefined event or condition. It should be understood herein that the term alarm, as used herein, may indicate any of the possible outcomes of a detection by system 20 of a condition or event.

The control unit 52, and in some embodiments, the processor 54, may be coupled to the at least one light source 36 and the at least one light sensitive device 38 via connectors. The light sensitive device 38 is configured to convert the scattered light received from a node 34 into a corresponding signal receivable by the processor 54. In an embodiment, the signal generated by the light sensing device 38 is an electronic signal. The signal output from the light sensing device 38 is then provided to the control unit 52 for processing via the processor 54 using an algorithm 58 to determine whether a predefined condition is present.

With reference back to FIG. 1, the light sensitive device 38 may include one or more Avalanche Photodiode (APD) sensors 64. For example, an array 66 of APD sensors 64 may be associated with the one or more fiber harnesses 30. In an embodiment, the number of APD sensors 64 within the sensor array 66 is equal to or greater than the total number of fiber harnesses 30 operably coupled thereto. However, embodiments where the total number of APD sensors 64 within the sensor array 66 is less than the total number of fiber harnesses 30 are also contemplated herein.

Data representative of the output from each APD sensor 64 in the APD array 66 may be periodically taken by a switch 68, or alternatively, may be collected simultaneously. A data acquisition module 67 collects the electronic signals from the APD and associates the collected signals with data relevant to a determination of location, time, and likelihood of nuisance or of monitored condition; as an example time, frequency, location or node. In an exemplary embodiment, the electronic signals from the APD sensor 64 are synchronized to the laser modulation such that the electrical signals are collected for a period of time that starts when the laser is pulsed to several microseconds after the laser pulse. The data will be collected and processed by the processor 54 to determine whether any of the nodes 34 indicates the existence of a predefined condition or event. In an embodiment, only a portion of the data output by the sensor array 66 is collected, for example the data from a first APD sensor 64 associated with a first fiber harness 30. The switch 68 may therefore be configured to collect information from the various APD sensors 64 of the sensor array 66 sequentially. While the data collected from a first APD sensor 64 is being processed to determine if an event or condition has occurred, the data from a second APD sensor 64 of the sensor array 66 may be collected and provided to the processor 54 for analysis. When a predefined condition or event has been detected from the data collected from one of the APD sensors 64, the switch 68 may be configured to provide additional information from the same APD sensor 64 to the processor 54 so as to track the condition or event at the location and/or under the conditions the condition or event was detected.

In an embodiment, a single control unit 52 can be configured with one or multiple APDs and the corresponding light sensitive devices 38 necessary to support multiple fiber harnesses 30. For example, 16 APDs with corresponding light sensitive devices 38 necessary to support 16 fiber harnesses 30, each fiber harness 30 having up to 30 nodes, resulting in a system with up to 480 nodes that can cover an area being monitored of up to 5000 square meters $m^2$. However, it should be understood that the system can be reconfigured to support more or fewer nodes to cover large buildings with up to a million $m^2$ or small enclosures with 5 $m^2$. The larger coverage area enables reducing or removing fire panels, high sensitivity smoke detectors and/or control panels, which may reduce cost and/or complexity of an installed hazard control system.

The light sensing device 38 generates a signal in response to the scattered light received by each node 34, and provides that signal to the control unit 52 for further processing. Using one or more algorithms 58 executed by the processor 54, each signal representing the scattered light received by each of the corresponding nodes 34 is evaluated to determine whether the light at the node 34 is indicative of a predefined condition, such as smoke, for example. The signal indicative of scattered light is parsed into a plurality of signals based on their respective originating node 34. One or more characteristics or features (pulse features) of the signal may be determined. Examples of such features include, but are not limited to, a peak height, an area under a curve defined by the signal, statistical characteristics such as mean, variance, and/or higher-order moments, correlations in time, frequency, space, and/or combinations thereof, and empirical features as determined, by deep learning, dictionary learning, and/or adaptive learning and the like, to be relevant to or to be added to the predefined set of monitored conditions.

Figure 3:
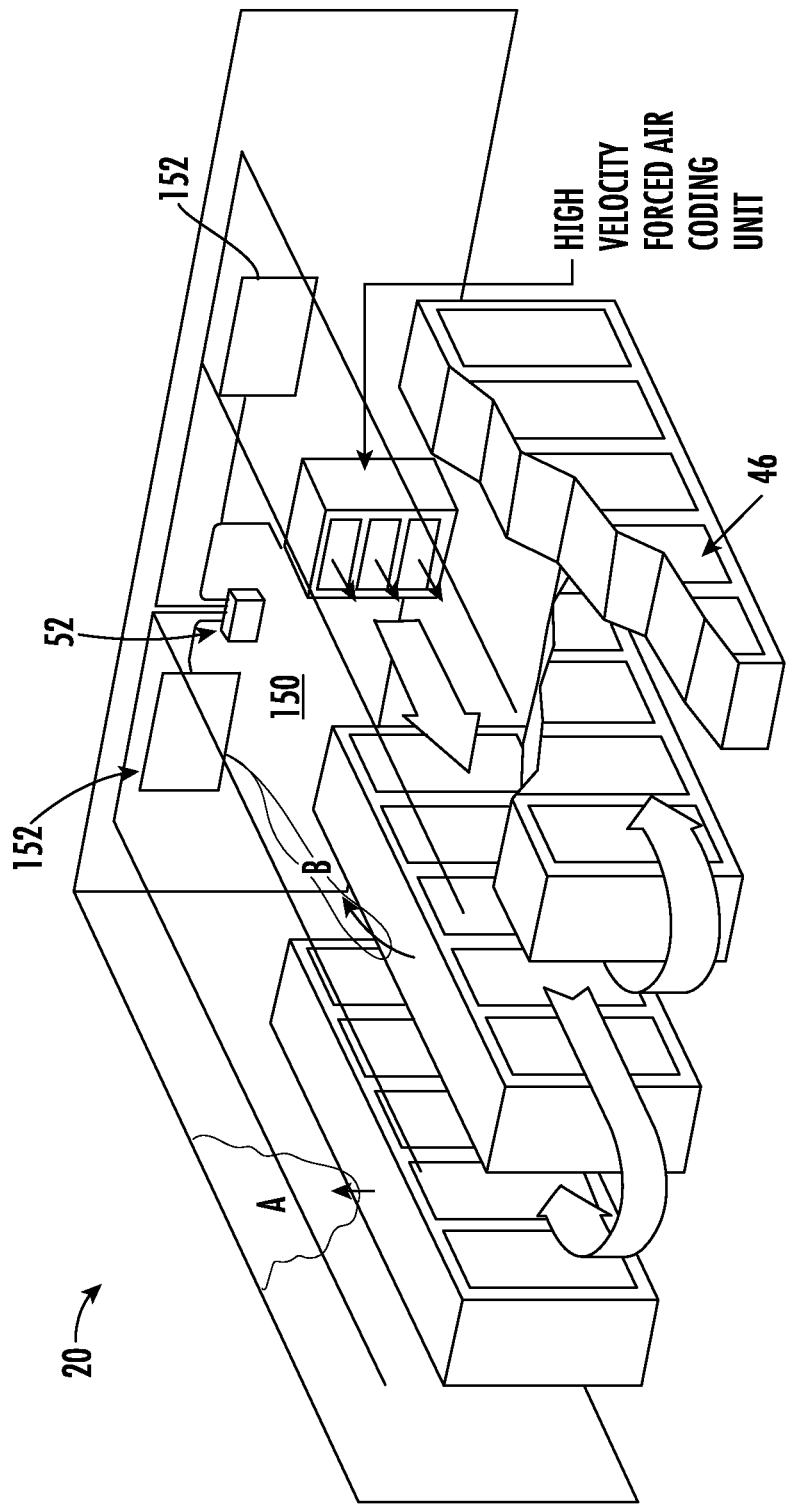
FIG. 3 is a perspective view of a detection system associated with a protected space according to one or more embodiments.

Referring now to FIG. 3, an example of a detection system 20 deployed in a representative protected space 150 of a data center is illustrated. The detection system 20 contains a plurality of equipment cabinets 46, such as server racks or other equipment, for example. In an embodiment, at least a portion of the detection system 20 is located near one or more vents 152 located within the protected space 150. In order to accomplish the monitoring of the protected space 150, two or more dissimilar nodes 34 may be used as depicted in FIG. 1. A first node 34 may provide information about the overall state of the protected space 150, while a second node provides detailed spatial information about part of the protected space 150. The information collected by the first and second nodes 34 will be analyzed via a detection algorithm 58 to determine whether the light at each node 34 is indicative of a predefined condition, such as smoke, for example. In FIG. 3 letter "A" indicates smoke in static air that has not gone back to air handling units via vents 152 and letter "B" indicates smoke in maximum ventilated air returning to the air handling units via the vents but has not entered a path of a laser yet.

The light scattering information collected from each node 34, may be evaluated individually to determine a status at each the node 34, and initiate an alarm if necessary. Alternatively, or in addition, the data from each node 34 may be analyzed in aggregate, such as via cooperative data fusion for example, to perform a more refined analysis when determining whether to initiate an alarm, sometimes referred to as "object refinement."

Figure 4:
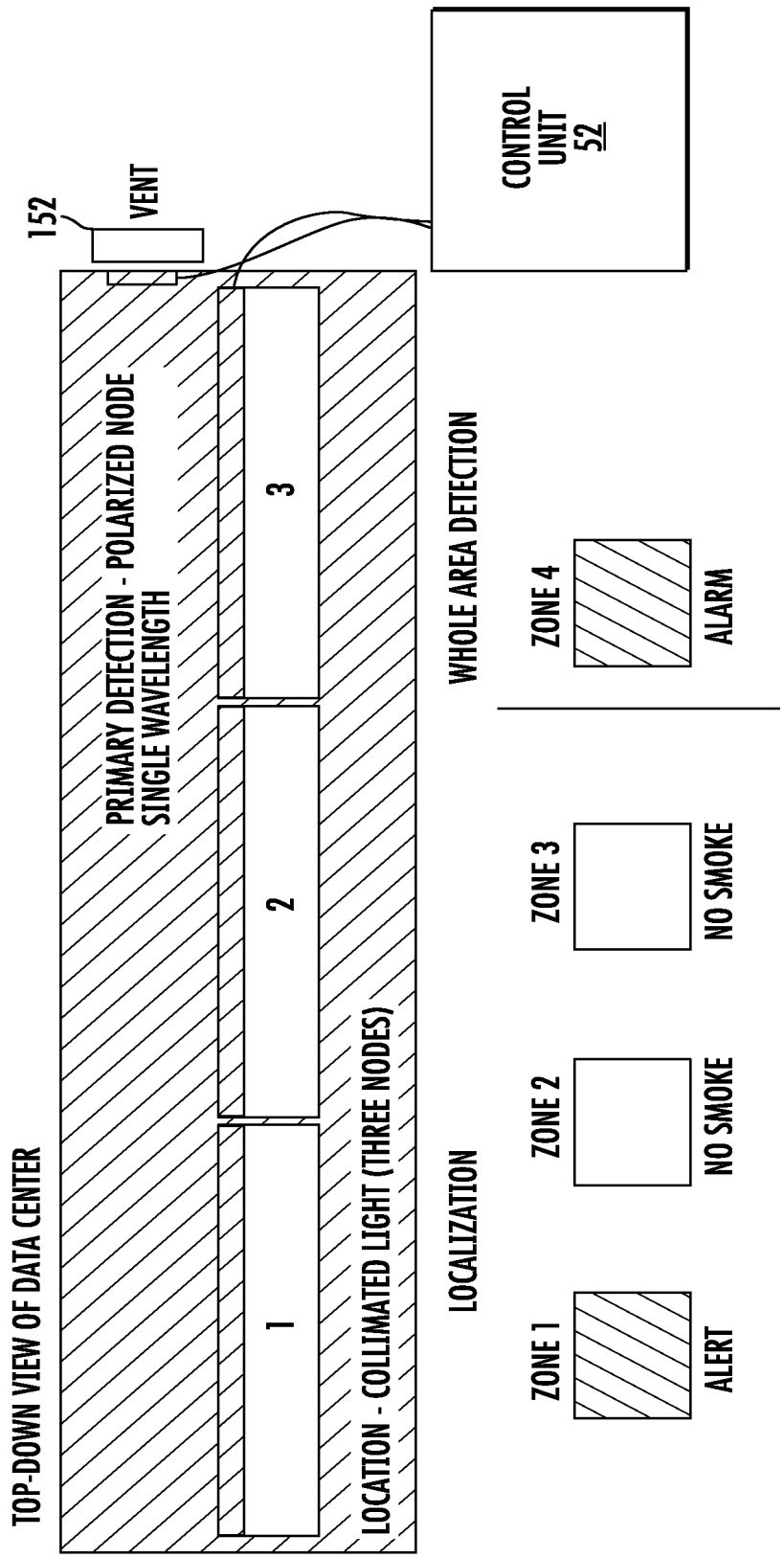
FIG. 4 is a top-down view of a portion of the protected space schematic diagram with a detection system having a plurality of zones for determining the possible location of smoke or pollutants according to one or more embodiments.

With reference to FIG. 4, in an embodiment, a signal indicative of the scattered light, and therefore the corresponding time of flight record, is parsed via the processor 54 (FIGS. 1 and 2) of the control unit 52 to form a plurality of zones. The parsing may be performed based on the duration of the time of flight and/or based on the originating node of the signal. Each zone may be associated with one or more specific detectors or nodes 34, or alternatively, may be associated with a region of the space being monitored, which may include a single node or multiple nodes 34. In an embodiment, one or more pieces of equipment, such as vents 152 for the air handling units, for example, are located within each of the respective zones. Evaluation of a event or condition can be performed based on each zone to more efficiently identify the location of the event.

In one or more embodiments, as shown in FIG. 4 for example, a primary whole area polarized node at the vent 152 performs primary detection for the whole of the area, such as the data center. Whole area detection refers to detecting an event based on air received from the entire area, without focusing on an individual zone. The primary node includes a vertical polarized channel and a horizontal polarized channel and the secondary node includes a red channel and a green channel. Secondary or collimating nodes perform localized event detection at one or more zones, depicted as zone 1, zone 2 and zone 3 in FIG. 4.

A user interface on the control unit 52, a laptop or on another device, may display the detection status of one or more of the nodes 34. For example, an alarm may be generated for zone 4 (whole area detection) based on scattered light measured by the primary and secondary nodes. By parsing the time of flight record into zones associated with the one or more corresponding nodes 34, if smoke or another event occurs within a zone, a change in the light scattering will be detected within that zone.

Through application of the data processing, the features may then be further processed by using, for example, smoothing, Fourier transformation or cross correlation. In an embodiment, the processed data is then sent to the detection algorithm to determine whether or not the signal indicates the presence and/or magnitude of a condition or event at a corresponding node 34. This evaluation may be a simple binary comparison that does not identify the magnitude of deviation between the characteristic and a threshold. The evaluation may also be a comparison of a numerical function of the characteristic or characteristics to a threshold. The threshold may be determined a priori or may be determined from the signal. The determination of the threshold from the signal may be called background learning.

Background learning may be accomplished by adaptive filtering, model-based parameter estimation, statistical modeling, and the like. In some embodiments, if one of the identified features does not exceed a threshold, the remainder of the detection algorithm is not applied in order to reduce the total amount of processing performed during the detection algorithm. In the event that the detection algorithm indicates the presence of the condition at one or more nodes 34, an alarm or fire suppression system may, but need not be activated.

In addition to evaluating the signals generated from each node 34 individually, the processor 54 may additionally be configured to evaluate the plurality of signals or characteristics thereof collectively, such as through a data fusion operation to produce fused signals or fused characteristics. The data fusion operation may provide information related to time and spatial evolution of an event or condition. As a result, a data fusion operation may be useful in detecting a lower level event, insufficient to initiate an alarm at any of the nodes 34 individually. For example, in the event of a slow burning fire, the light signal generated by a small amount of smoke near each of the nodes 34 individually may not be sufficient to initiate an alarm. However, when the signals from the plurality of nodes 34 are reviewed in aggregate, the increase in light returned to the light sensitive device 38 from multiple nodes 34 may indicate the occurrence of an event or the presence of an object not otherwise detected. In an embodiment, the fusion is performed by Bayesian Estimation. Alternatively, linear or non-linear joint estimation techniques may be employed such as maximum likelihood (ML), maximum a priori (MAP), non-linear least squares (NNLS), clustering techniques, support vector machines, decision trees and forests, and the like.

Thus, one or more signals including scattered light and raw time of flight information are received by the control unit 52 from one or more light sensitive devices 38. In response to this information, the control unit 52, parses the time of flight information into information associated with individual zones and/or nodes of the detection system 20. The control unit 52 also processes the scattered light information contained within each signal to identify one or more features within the scattered light. These features can then be used by a detection algorithm to process the information associated with a single node or zone, or alternatively or additionally, data fusion may be performed to analyze the information from several nodes or zones. The output is then used to determine an alarm status and, in instances where the alarm status would prompt initiation of an alarm, e.g., based upon comparison of the alarm status to known or pre-populated conditions within a table (or other suitable data structure), initiate an alarm.

The processing unit 54 of the control unit 52 may include a field-programmable gate array board (FPGA) wherein the FPGA firmware performing the data processing of the control unit 52 of the control system 50. Also, the FPGA firmware may include laser drivers for driving the lasers and a laser firing and data sampler timer for collecting laser firing data associated with the horizontal and vertical polarization lasers of the primary node received at a detector of the control unit 52 and the collimating red and green lasers of the collimating received at another detector of the control unit 52. The laser driver is associated with an analog digital converter (ADC) to correlate the detectors firing and the lasers firing so that the collected data with information regarding the detection at the primary and secondary nodes which is then parsed out to determine where to look for smoke or pollutants. In one or more embodiments, pulsed data is collected at 2000 ns for each channel and 1 pulse of accumulated data contains 4 channels. The FPGA board also preferably includes an Ethernet controller for transmitting, via Ethernet using User Datagram Protocol (UDP) or Transmission Control Protocol (TCP), a data stream to a cloud computing environment for performing cloud-based computing. However, other reliable protocols may instead be used.

Figure 5:
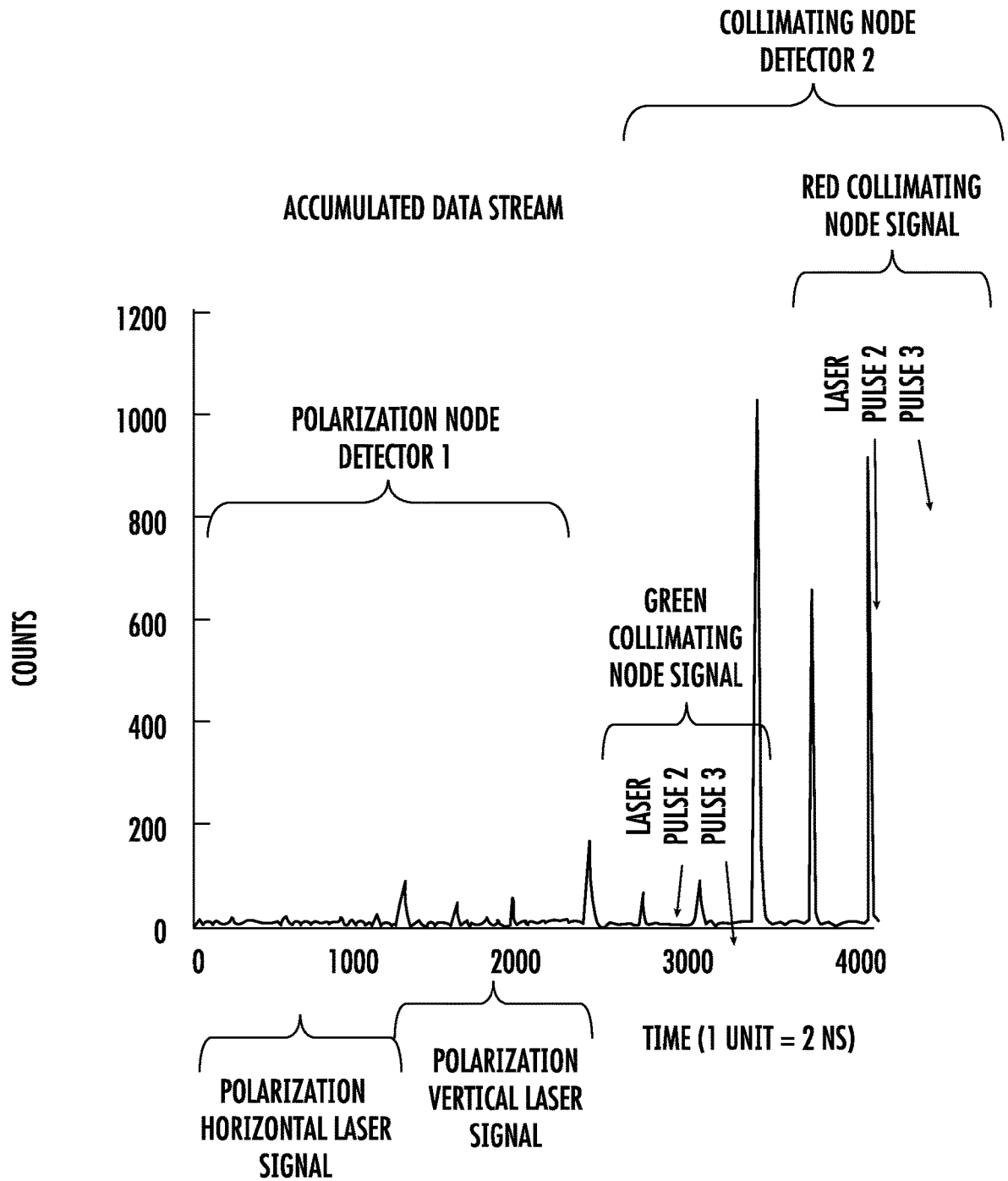
FIG. 5 is a graph representing the different components of an accumulated data stream according to one or more embodiments.

As shown in FIG. 5, in one or more embodiments, the control unit 52 receives multiple data streams, referred to an accumulated data stream. In the example of FIG. 5, the accumulated data stream includes a polarization horizontal signal and a polarization vertical signal from a polarization node detector. The accumulated data stream also includes a green collimating node signal and a red collimating node signal from a collimating node detector.

Figure 6A:
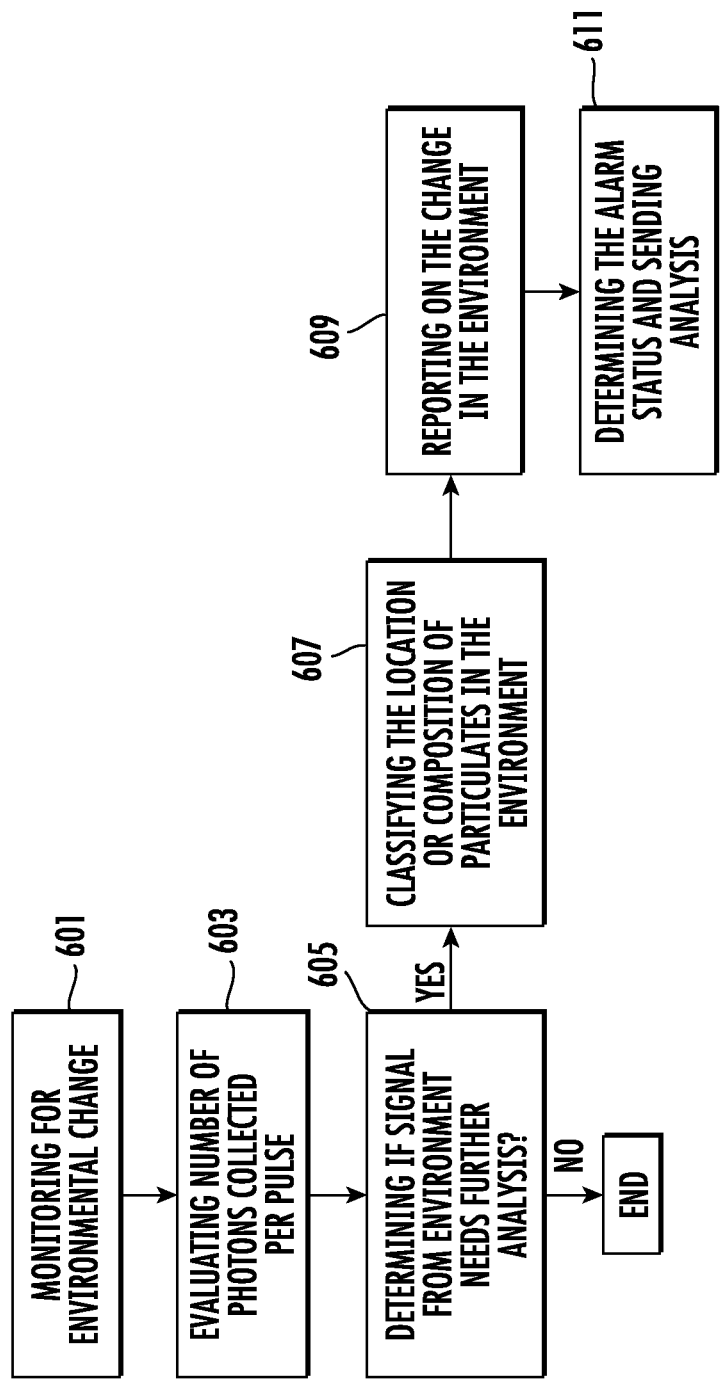
FIG. 6A depicts a high-level process flow for determining whether an alert should be made according to one or more embodiments.

FIG. 6A depicts a high-level process flow for determining whether an alert should be made. The process of FIG. 6A may be executed by the control unit 52. At 601, the process detects an environmental change by detecting that the light scattering from one of the data streams exceeds a threshold. At 603, the process evaluates the light scattering signal to determine a number of photons per pulse. At 605, the process determines if the signal requires further analysis based on the number of photons per pulse. For example, smoke produces 1-2 photons per pulse whereas solid objects scatter many more photons per pulse. A light scattering signal with a large number of photons per pulse is classified as a large solid object. At 605, a light scattering signal with a number of photons collected per pulse lower than a threshold requires further analysis. If further analysis is warranted, flow proceeds to 607.

At 607, the location or composition of the particulates in the environment is determined. The location of particulates may be determined using a localization process as described herein. Composition classification of particulates may be achieved using a polarization node algorithm as described herein. At 609, the change in the environment detected at 605 and 607 is reported, to one or both of a central controller or a cloud commuting environment. At 611, an alarm status to report on the change in the environment is determined. The alarm status may be determined using a decision tree, ensemble, artificial intelligence, Bayesian estimation or parallel decision making approach. Results of the localization and composition from 607 may also be communicated with the alarm decision.

Figure 6B:
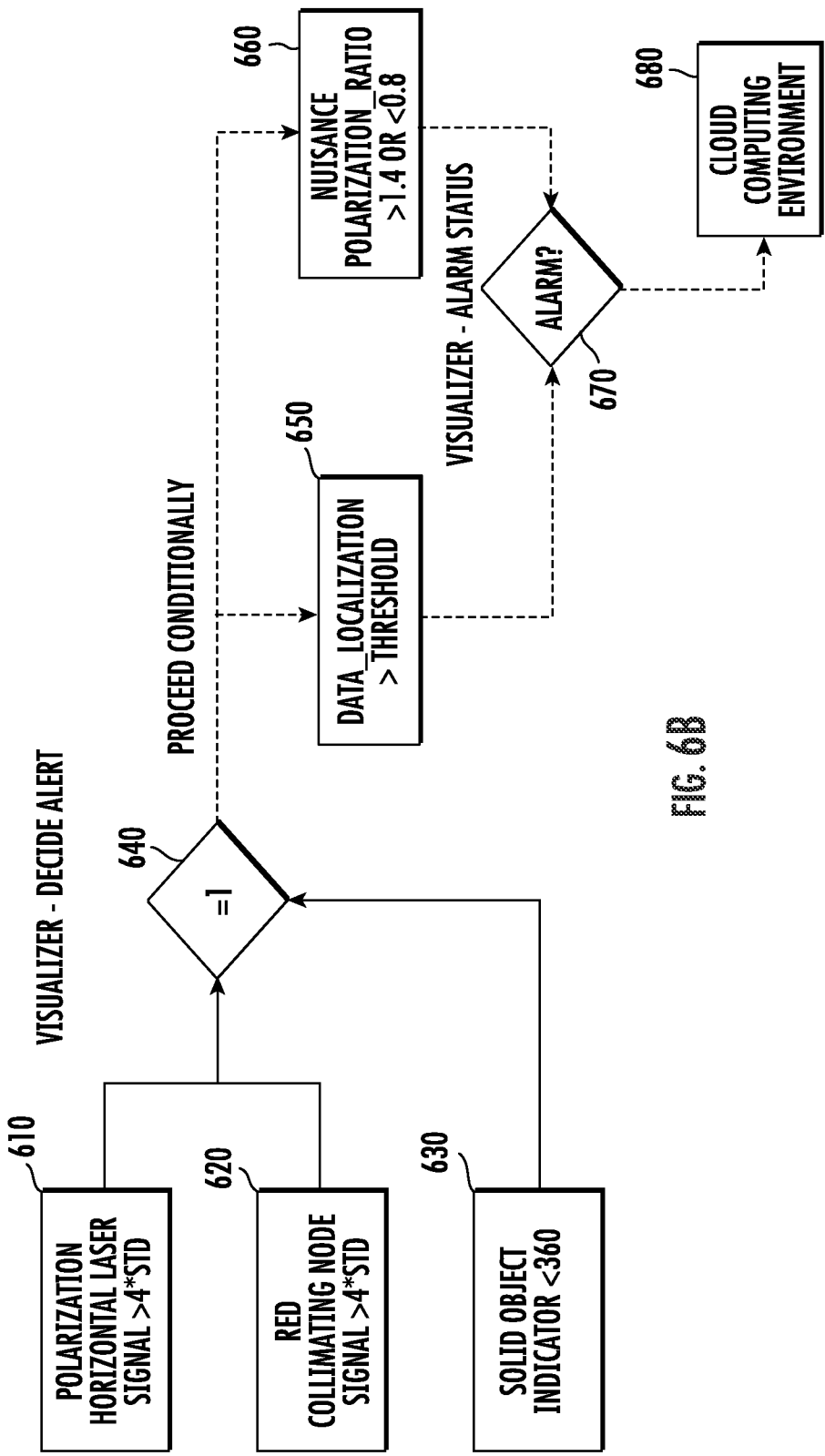
FIG. 6B is a schematic diagram of process flow for determining whether an alert should be made based on the sensed presence of smoke or other pollutant and then determining the status of the alarm utilizing the processed accumulated data stream according to one or more embodiments.

FIG. 6B depicts a detailed process flow for determining whether an alert should be made. The accumulated data stream may be processed at the control unit 52 by implementing an alarm algorithm of FIG. 6B for determining whether an alert should be made based on the presence of smoke or other pollutant and then determining the status of the alarm utilizing the processed accumulated data stream. Alternatively, all or part of the algorithm of FIG. 6B may be implemented in a cloud computing environment. FIG. 6B illustrates an embodiment of an example algorithm 58 (shown in FIG. 2) that is partially performed on the control unit 52 for determining whether an alert should be made based on the presence of smoke or other pollutants and then determining a status of the alarm utilizing the processed accumulated data stream.

The control unit 52 analyzes a polarization horizontal signal and a polarization vertical signal from the polarization node detector and a green collimating node signal and a red collimating node signal from the collimating node detector (FIG. 5). At 610, the polarization horizontal signal is compared to a threshold to determine if the light scattering exceeds a threshold (e.g., is light scattering greater than four standard deviations). At 610, if the light scattering exceeds the threshold, a true condition is indicated. At 620, the red collimating node signal is compared to a threshold to determine if the light scattering exceeds a threshold (e.g., is light scattering greater than four standard deviations). At 620, if the light scattering exceeds the threshold, a true condition is indicated.

At 630, one or both of the data stream from the polarization node detector and the collimating node detector is used to detect if a solid object is present. A process to derive a solid object indicator is shown in FIG. 9 and discussed below. At 630, a solid object indicator (e.g., the number of photons per pulse) is determined. The solid object indicator is compared to a threshold. If the solid object indicator is less than the threshold (e.g., 360), this indicates that a large object is not present. At 630, if the solid object indicator is less than the threshold, a true condition is indicated. The operations at 610, 620 and 630 may be performed simultaneously.

The true or false conditions at each of blocks 610, 620 and 630 are combined at 640 to determine if further analysis is warranted. If all of the results of blocks 610, 620 and 630 are true, this indicates that further analysis is needed to detect an event. Otherwise, the process continues monitoring the data streams until the conditions at blocks 610, 620 and 630 are all true.

The process proceeds from block 640 to block 650 and block 660 to classify the light scattering. In block 650, the data from the collimating node detector is analyzed to determine a data localization value of particles using a sub-routine as shown in FIG. 8B and discussed below. The data localization value is compared to a threshold at block 650.

Figure 7A:
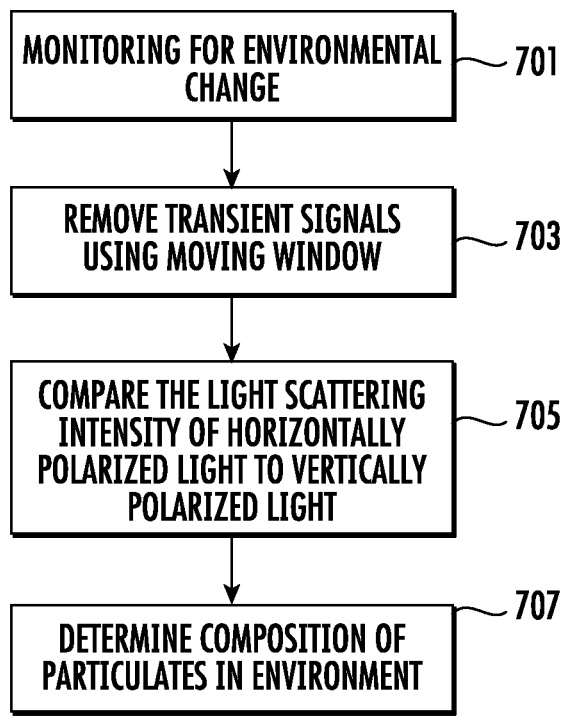
FIG. 7A depicts a high-level process flow of a polarization node algorithm according to one or more embodiments.
Figure 7B:
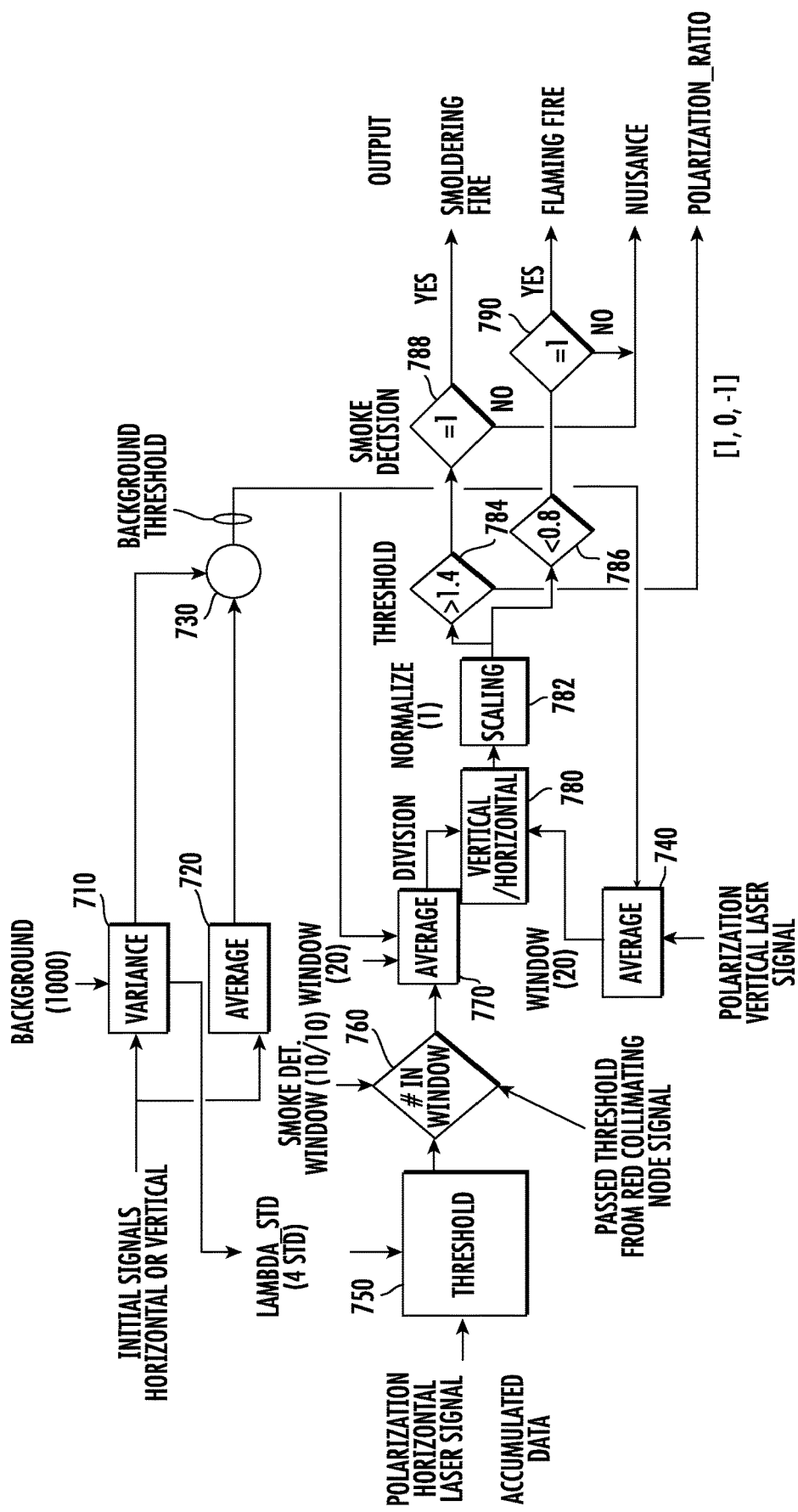
FIG. 7B is a schematic diagram of process flow for determining a nuisance determination ratio used for determining the presence of nuisances such as solid objects within the area according to one or more embodiments.

In block 660, the data from a polarization node detector is analyzed to determine a polarization ratio using a subroutine as shown in FIG. 7B and discussed below. In block 660, it is determined if the polarization ratio (e.g. horizontal versus vertical polarization), is greater than an upper limit (e.g., 1.4) or less than a lower limit (e.g., 0.8).

At block 670, the results of block 650 and block 660 are analyzed to determine if an alarm condition is present. Block 670 considers whether the data localization value exceeds the threshold at block 650 and whether the polarization ratio is greater than the upper limit or less than the lower limit at block 670. Block 670 may include using a variety of techniques, including a decision tree, ensemble, artificial intelligence, Bayesian estimation or parallel decision making to determine alarm status. If an alarm condition is detected, the results of block 650 and block 660 are passed to the cloud with the alarm decision as shown at 680. An alarm may also be indicated visually on the control unit 52 or transmitted to a personal device, computer or other device capable of indicating the alert and the alarm.

FIG. 7A depicts a high-level process flow of a polarization node algorithm, used at block 660 of FIG. 6B. The process of FIG. 7A may be executed by the control unit 52. At 701, is it determined if a light scattering signal from one or more data streams exceeds a threshold. The threshold may be set using a multiplication factor of a standard deviation added to a mean, as described below with reference to FIG. 7B. At 703, a moving window filter is used to remove transient signals. To pass through the filter, multiple successive signals must be present during a period of time. At 705, the polarization vertical signal is divided by the polarization horizontal signal to define a ratio. At 707, the composition of particulates is analyzed based on the polarization horizontal signal, the polarization vertical signal and the ratio. Block 707 may include a decision tree, ensemble, artificial intelligence, Bayesian estimation or parallel decision making.

FIG. 7B depicts a detailed process flow of a polarization node algorithm to determine the polarization ratio used in block 660 of FIG. 6B. The polarization horizontal signal and/or the polarization vertical signal from the polarization node detector are analyzed to determine any background variances and an average is determined as shown in block 710 and block 720. A background threshold is established at block 730. In the example of FIG. 7B, the background threshold is a multiple of the variance from block 710 added with the mean from block 720.

If the polarization horizontal signal exceeds the background threshold at block 750, the polarization horizontal signal is processed at block 760 where a moving window is used to eliminate transient signals. The moving window applied at block 760 requires multiple successive signals to be present during a period of time, thereby eliminating transient signals. The polarization horizontal signal is then passed to block 770 where the signals are averaged using a moving window. The polarization vertical signal is processed at block 740, where the polarization vertical signal is averaged using a moving window.

At block 780, the vertical polarization signal is divided by the horizontal polarization signal to define the polarization ratio. The polarization ratio of block 780 is then scaled in block 782. In block 784, an upper limit (e.g., 1.4) is utilized to identify the presence of a smoldering fire when the polarization ratio exceeds the upper limit. When the polarization ratio exceeds the upper limit, a smoldering fire is indicated at block 788. In 786, a lower limit (e.g., 0.8) is utilized to identify the presence of a flaming fire when the polarization ratio is less than the lower limit. When the polarization ratio is less than the lower limit, a flaming fire is indicated at block 790. If neither condition in block 786 and block 784 is met, than the output is deemed a nuisance. In addition, the polarization ratio is output.

The polarization ratio output can be utilized remotely to provide additional classification of the fire source. The classification of the light signals from the polarization node enables potential smoke source identification. In data center applications, flaming fire sources tend to be high voltage components such as UPS, power cables and fans. Whereas, smoldering fires come from low voltage components such as communication cables, servers and server racks. Nuisances are often times introduced from stirring up dust or from external to the environment. The additional classification of source is provided based on the output of the algorithm using lookup tables.

Figure 8A:
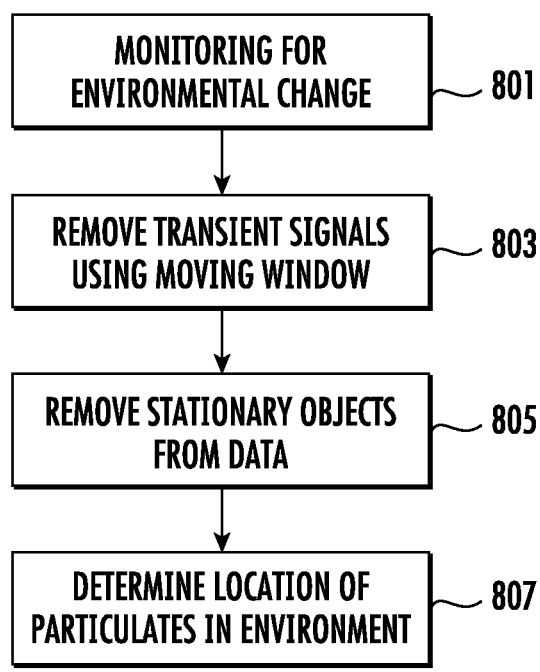
FIG. 8A depicts a high-level process flow of a collimating node algorithm according to one or more embodiments.
Figure 8B:
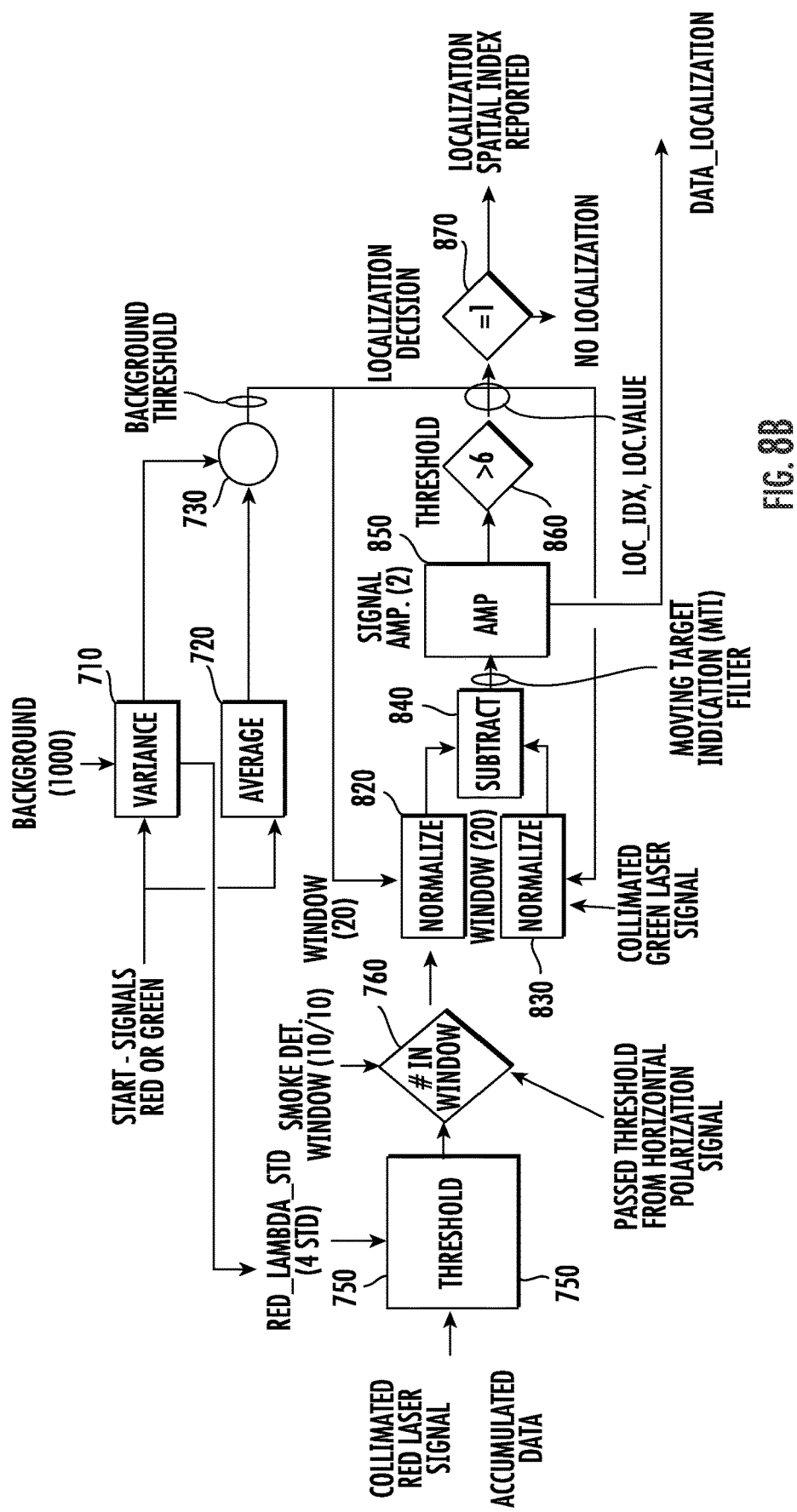
FIG. 8B is a schematic diagram of process flow for identifying moving targets within a protected area according to one or more embodiments.

FIG. 8A depicts a high-level process flow of a collimating node algorithm, used at block 650 of FIG. 6B. The process of FIG. 8A may be executed by the control unit 52. At 801, it is determined if a light scattering signal from one or more data streams exceeds a threshold. The threshold may be set using a multiplication factor of a standard deviation added to a mean, as described below with reference to FIG. 8B. At 803, a moving window filter is used to remove transient signals. To pass though the filter, multiple successive signals must be present during a period of time. At 805, stationary objects from the data stream(s) are detected and removed. The signals from multiple wavelengths (e.g., red and green) may be normalized, subtracted and subjected to a moving target filter to remove stationary objects. At 807, a location of particulates is analyzed using signal analysis approaches, either separately or together, to determine particulate location. Signal analysis approaches at 807 may include time or spatial analysis using thresholding, derivatives, FFT, correlation or persistence. A decision tree, ensemble, artificial intelligence, Bayesian estimation or parallel decision making is then employed to determine a location of particulates.

FIG. 8B depicts a more detailed collimating node algorithm to determine the data localization value used in block 650 of FIG. 6B. The process of FIG. 8B operates on signals from two laser emitters with different wavelengths. In this example, a red laser and green laser are utilized, but any combination is envisioned. The collimated red signal or the collimated green signal from the collimating node detector are analyzed to determine any background variances and an average is determined as shown in block 710 and block 720. A background threshold is established at block 730. In the example of FIG. 8B, the background threshold is a multiple of the variance from block 710 added to the mean from block 720.

If the collimated red signal exceeds the background threshold at block 750, the collimated red signal is processed at block 760 where a moving window is used to eliminate transient signals. The moving window applied at block 760 requires multiple successive signals to be present during a period of time, thereby eliminating transient signals. The collimated red signal is then passed to block 820 where the collimated red signal is normalized. The collimated green signal is processed at block 830, where the collimated green signal is normalized.

At block 840, the normalized collimated red signal and the normalized collimated green signal are subtracted from each other. At block 840, two sequential pulses are subtracted from one another to determine changes in light scattering intensity where the result of the operating indicates whether or not an object, smoke or particulate cloud is moving within a field of view. Because smoke and pollutants are stochastic or random in pattern, the result of the subtraction operation results in a different signal regardless of how fast the pulsing is. For example, a person or a moving hand in the field of view appears as a stationary object compared to smoke when pulsing every 6 microseconds. The output of block 840 is processed by a moving target indication (MTI) filter to remove the effect of stationary objects from the output of block 840. In block 850, the signal from block 840 is amplified to yield the data localization value.

In block 860, the data localization value is compared to a threshold (e.g., 6) and is evaluated to determine if particulates are present. If the data localization value is greater than the threshold, then at block 870 a localization spatial index is reported. The location of particulates is analyzed to using signal analysis approaches, either separately or together, to determine particulate location. Signal analysis approaches include time or spatial analysis using thresholding, derivatives, FFT, correlation or persistence. A decision tree, ensemble, artificial intelligence, Bayesian estimation or parallel decision making is then employed to determine location of the particulates in an area. The data localization value may also be an output of the processing.

Figure 9A:
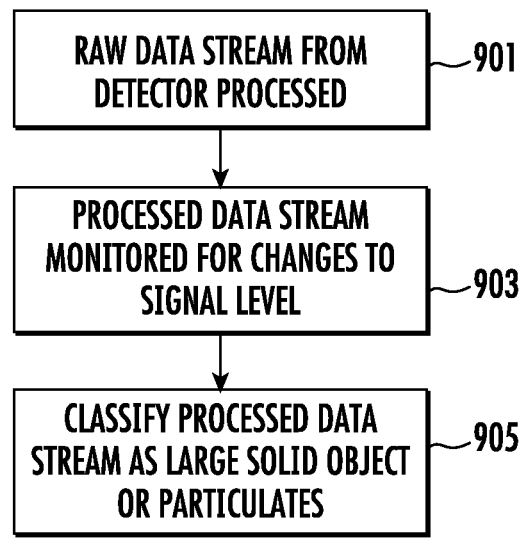
FIG. 9A depicts a high-level process flow of solid object nuisance discrimination according to one or more embodiments.

FIG. 9A depicts a high-level process flow of solid object nuisance discrimination according to one or more embodiments. The process of FIG. 9A may be executed by the control unit 52. At 901, one or more data streams from a node are analyzed to calculate a number of photons scattering back to the detector and the number of times one or more photons are returned to the detector. At 903, the values from 901 are compared to a background threshold. The background threshold may be set using a multiplication factor of the standard deviation added to the mean. At 905, the one or more data streams are classified as either a solid object or particulate. Block 905 may use Boolean logic to classify a signal as a solid object or particulate. In more complex implementations, linear/non-linear classification may be utilized using machine learning. In one example, support vector machine analysis can be utilize to draw one or more sloped boundaries to set ranges for classifying the signal between solid objects and particulates.

Figure 9B:
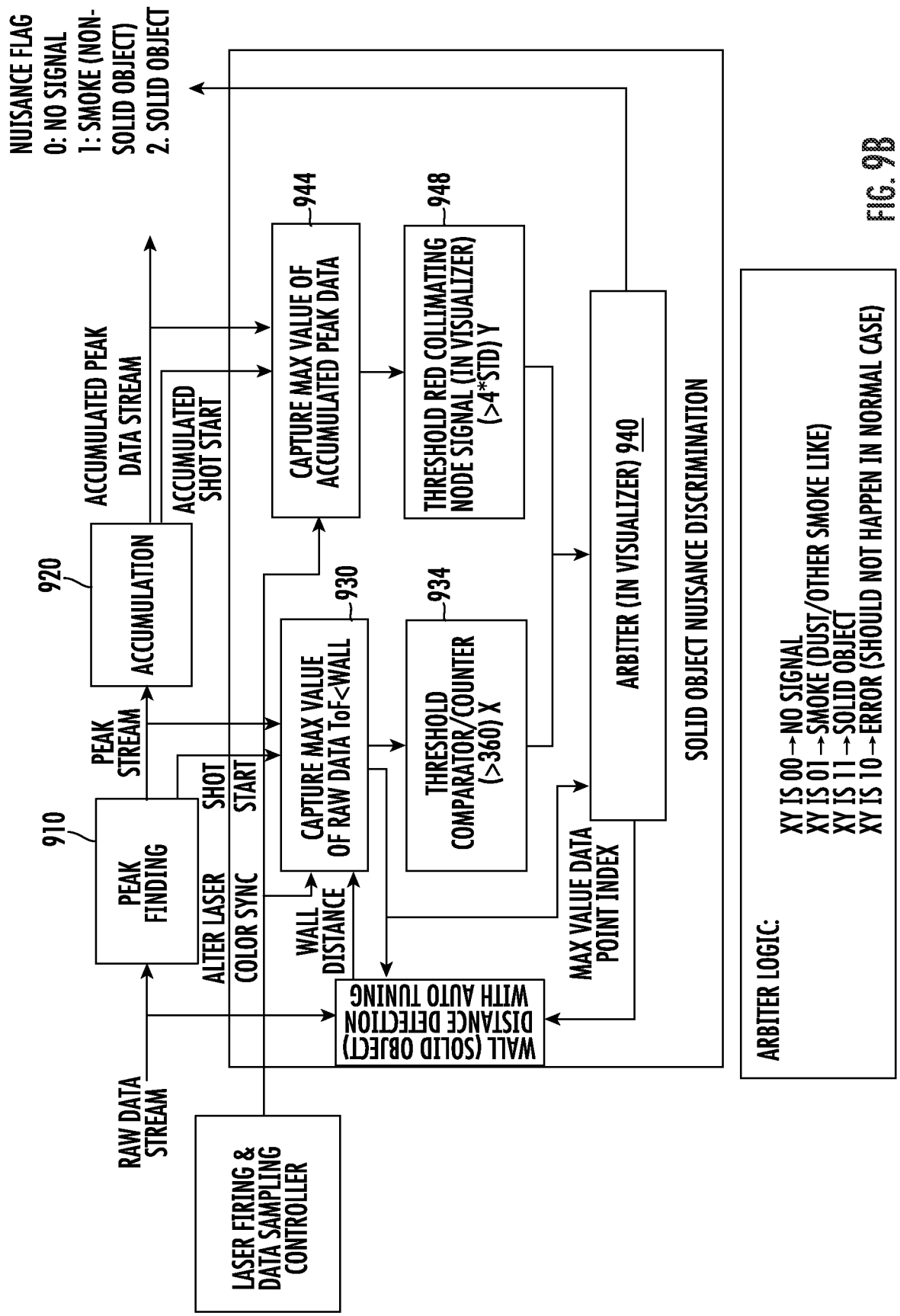
FIG. 9B is a schematic diagram of process flow for solid object nuisance discrimination according to one or more embodiments.

FIG. 9B depicts detailed processing to determine the solid object indicator used in block 630 of FIG. 6B. At block 910 the peak stream is identified from the raw data stream from a detector (either the polarization node detector or the collimating node detector). At block 920 an accumulated peak data stream is generated. The peak stream and a shot start are provided to block 930 to determine the maximum number of photons returned to the detector, for data where the time of flight (ToF) is less than the ToF to a wall of the area. Then, at block 934 the maximum number of returned photons is compared to a threshold (e.g., 360). When the maximum number of photons returned is larger than the threshold, a solid object indication (e.g. x=1) is generated at block 934. The variable "x" has a value of 1 when a solid object is present. Otherwise, variable x is set equal to "0".

From block 920, the accumulated peak data stream and an accumulated shot start is passed to block 944 where a maximum value of the accumulated peak data is captured. A block 948, the process determines if the red collimating node signal is greater than 4 times standard deviation of background threshold. The background threshold can be set using a multiplication factor of the standard deviation added to the mean. If the red collimating node signal is greater than 4 times standard deviation of background signal, block 948 generates variable y="1." If the red collimating node signal is not greater than 4 times standard deviation of background signal, block 948 generates variable y="0." Arbiter 940 includes arbiter logic where, as shown in FIG. 9B, there is no signal present if xy is 00, smoke, dust or some other pollutant is present if xy is 01, a solid object is present if xy is 11, and an error is present if xy is 10. The determination by the arbiter 940 can be provided to the cloud computing environment. In the embodiment of FIG. 9B, Boolean logic is utilized to classify a solid object or particulate. In other embodiments, linear non-linear classification can be utilized using machine learning. In one example, support vector machine analysis can be utilized to draw one or more sloped boundaries to set ranges for classifying the signal between solid objects and particulates.

Figure 10:
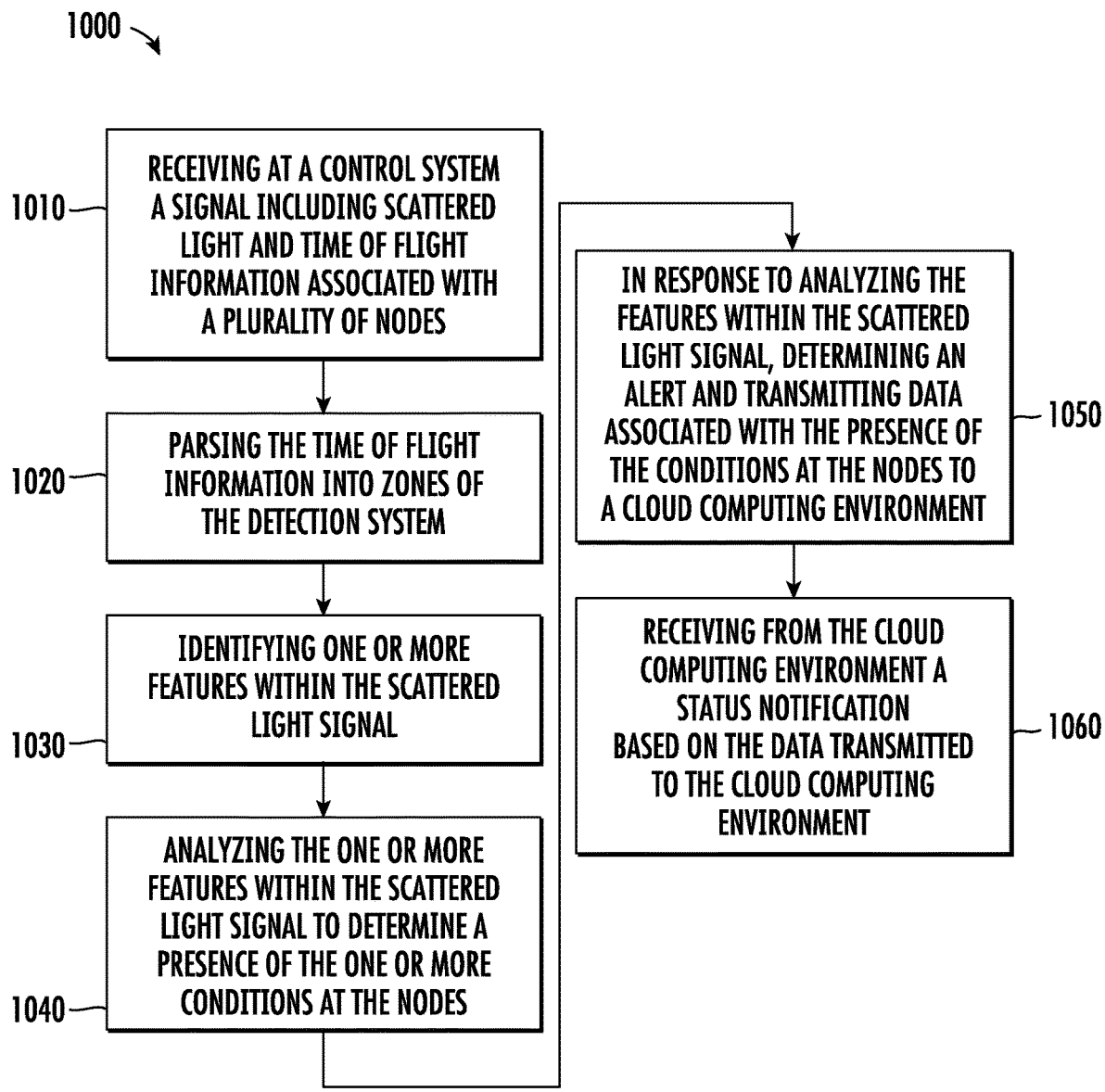
FIG. 10 is a method for measuring one or more conditions within an area according to one or more embodiments.

Turning to FIG. 10, one or more embodiments may include a method 1000 for measuring one or more conditions within an area. The flow diagram of FIG. 10 illustrates the method 1000 that includes block 1010 for receiving at a control system a signal including scattered light and time of flight information associated with a plurality of nodes of a detection system and block 1020 for parsing the time of flight information into zones of the detection system. The method 1000 also includes block 1030 for identifying one or more features within the scattered light signal and block 1040 for analyzing the one or more features within the scattered light signal to determine a presence of the one or more conditions at the plurality of nodes within the area. The method 1000 then includes block 1050 for determining an alert and transmitting data associated the presence of the one or more conditions at the plurality of nodes within the area to a cloud computing environment in response to analyzing the one or more features within the scattered light signal. The method 1000 also includes block 1060 for receiving from the cloud computing environment a status notification based on the data transmitted to the cloud computing environment.

One or more aspects or features of the present invention may be implemented using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
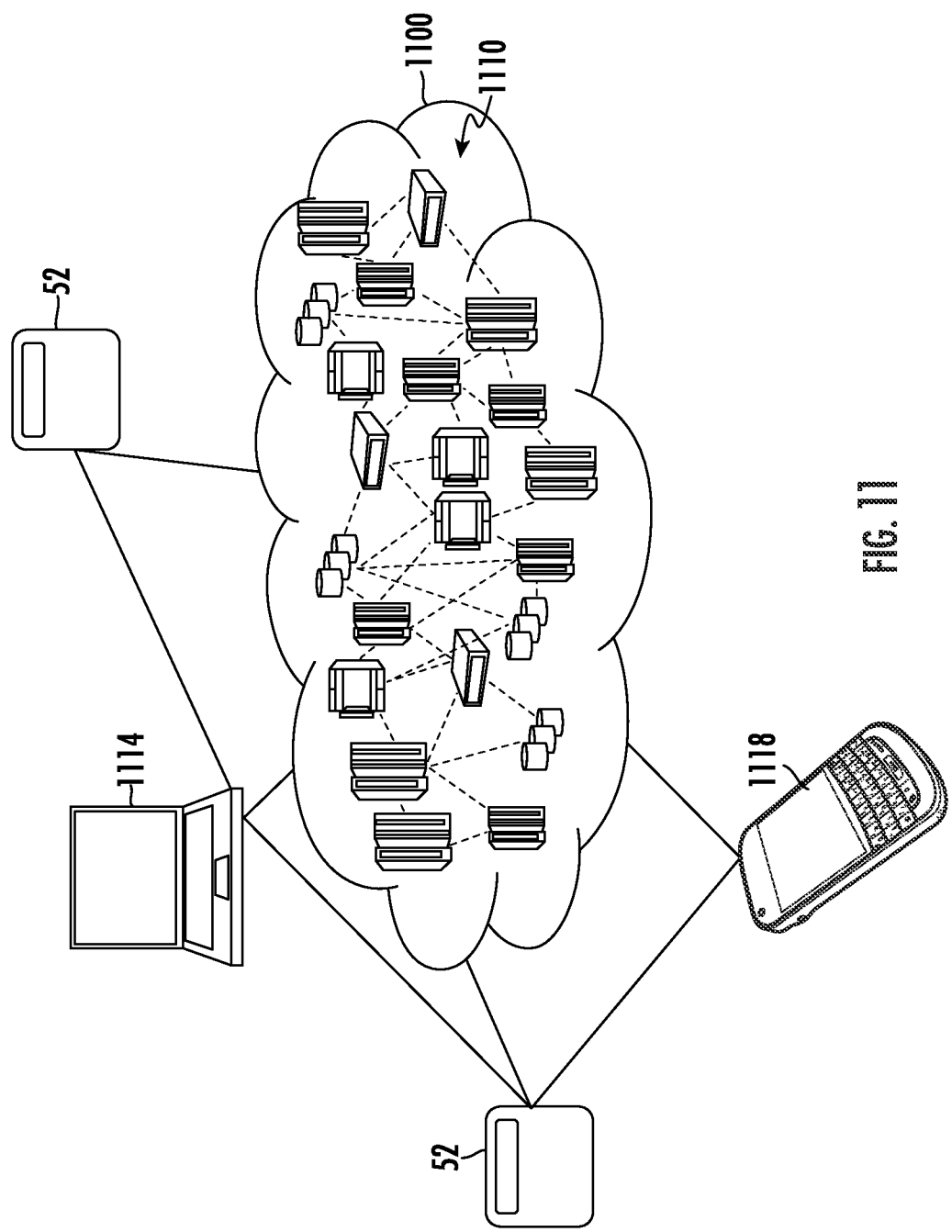
FIG. 11 depicts a cloud computing environment according to one or more embodiments.

Referring now to FIG. 11, illustrative cloud computing environment 1100 is depicted. As shown, cloud computing environment 1100 comprises one or more cloud computing nodes 1110 with which local computing devices used by cloud users, such as, for example, the control unit 52 may communicate. The control unit 52 may communicate directly with the cloud computing environment 1100 or with the cloud computing environment 1100 via another computing device such as, for example, a laptop 1114, a personal digital assistant (PDA) or cellular telephone 1118, or a desktop computer. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1100 to offer infrastructure, platforms and/or software as services for which a cloud consumer does not need to maintain resources on a local computing device. It is understood that the computing nodes 1110 and cloud computing environment 1100 can communicate with the control unit 52 and/or any type of computerized device over any type of network and/or network addressable connection (e.g., using a web browser).

Figure 12:
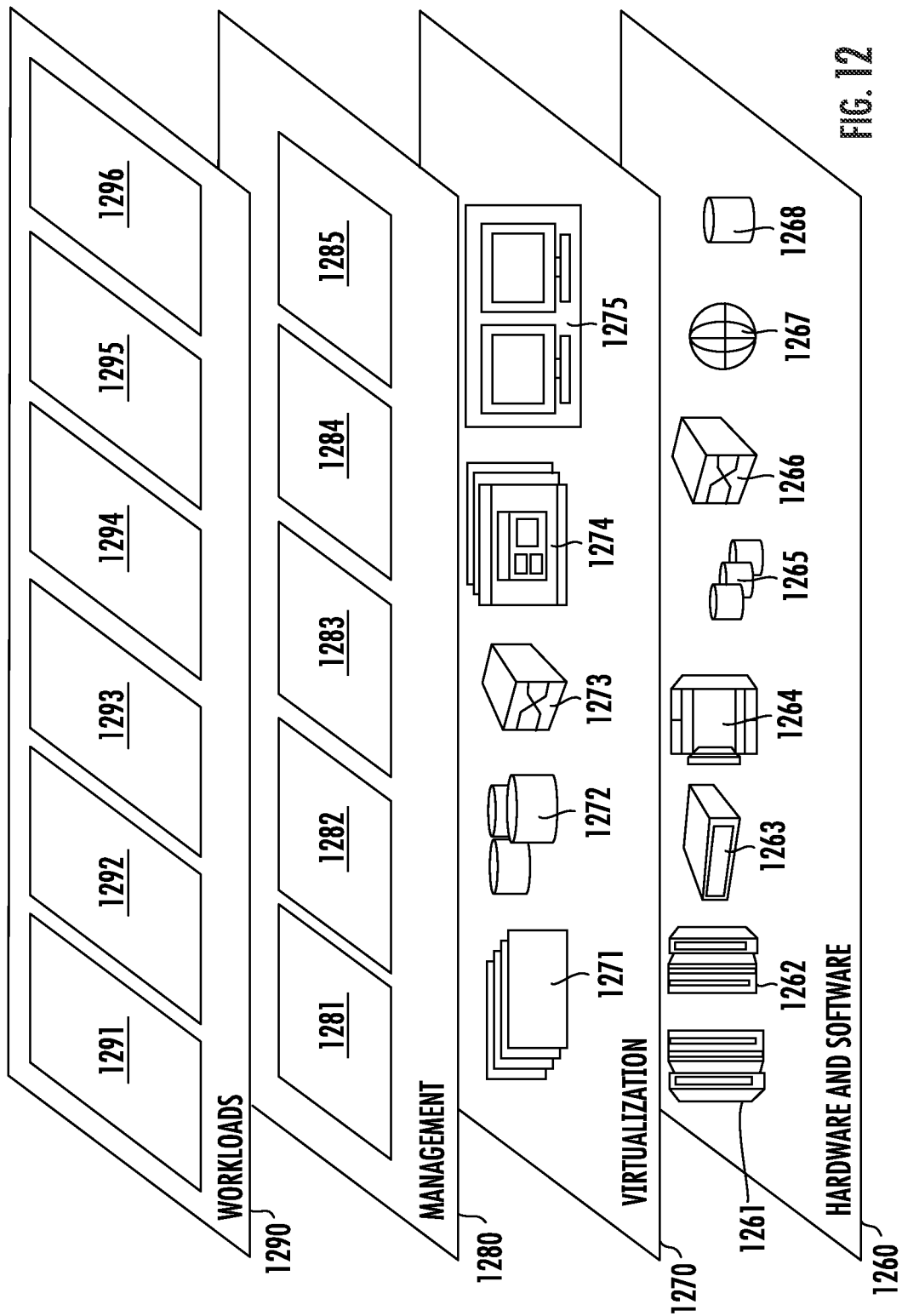
FIG. 12 depicts abstraction model layers of a cloud computer environment according to one or more embodiments.

Referring now to FIG. 12, a set of functional abstraction layers provided by cloud computing environment 1100 is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273; including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and pricing 1282 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and failure diagnostics processing 1296, for performing one or more processes for receiving accumulated data streams from one or more detection systems 20, providing notifications such as status reports back to the one or more detection systems 20, analyzing and generating localization information, determining types of smoke, pollutants and compositions located within an area based on the accumulated data stream and other received information from detection systems, and for performing one or more processes for determining source location and other failure diagnostics. The status notifications may also include alerts or a combination of alerts and alarms.

FIG. 13 depicts a user interface of a cloud-implemented application displaying a listing of multiple devices and their statuses. The devices correspond with control systems 50 of detection systems 20 that are networked together via the cloud computing environment 1100. The list of devices can correspond with all or part of an area and one or more buildings at one or more locations. In other words, the each area and associated device can correspond with a different room in the same building or different rooms in different buildings. The status of each of the devices depends on whether it is connected over the network and whether the accumulated data and other information received from the corresponding detection system 20 indicates a condition where smoke or some other pollutant or compound is detected. In one or more embodiments, each device is selectable to display information associated with a particular detection system 20. As a result of having multiple detection systems 20 networked together, one or more source locations of a fire or other pollutant can be determined amongst multiple areas. An alert and/or an alarm can be issued based on how one or more of the devices are operating.

Figure 14:
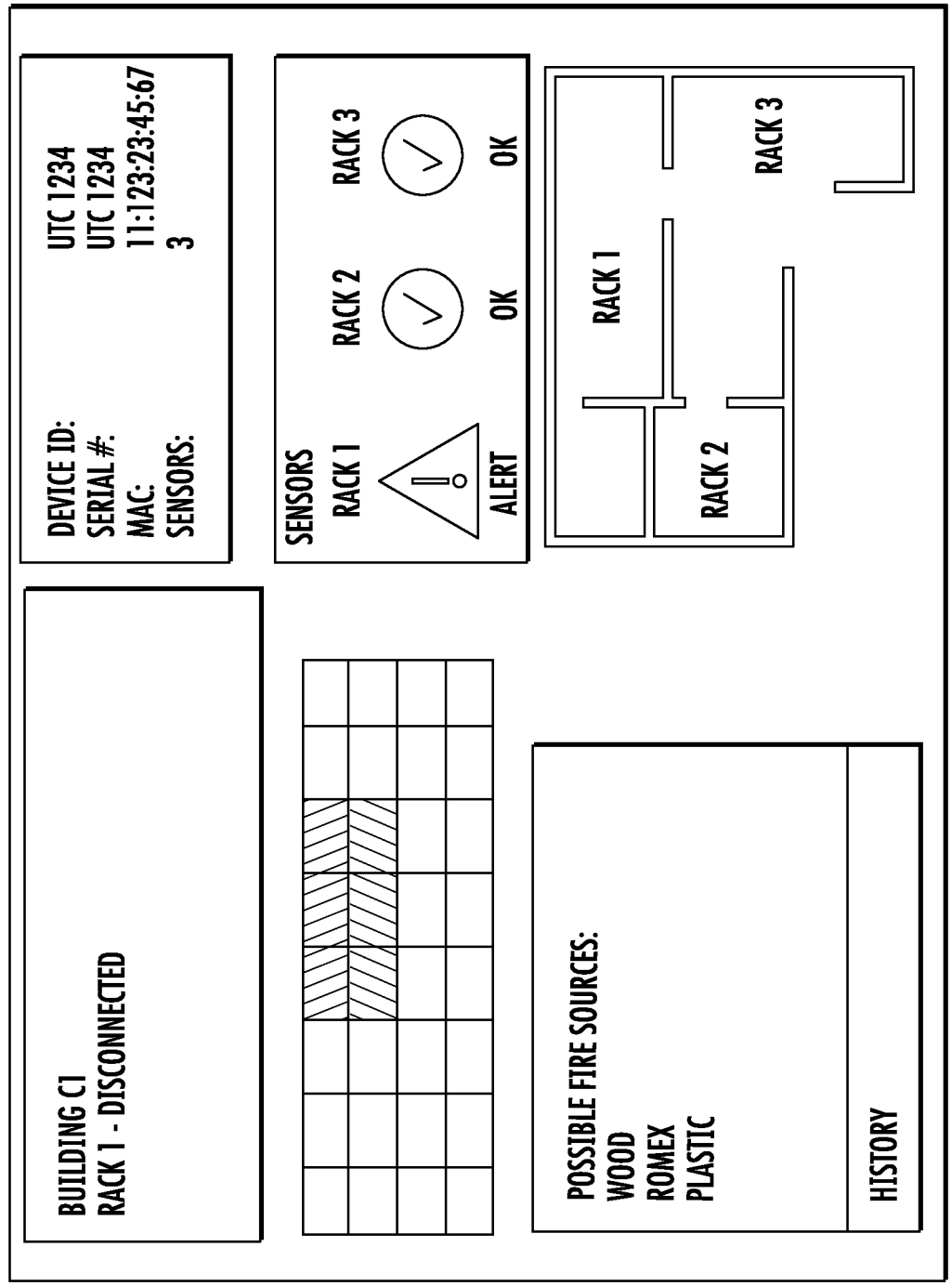
FIG. 14 depicts a source location in a particular room and the status of a corresponding device.

FIG. 14 illustrates a user interface depicting a visual representation of an area based on a spatial index relative to a shot index for a particular area. The location of smoke or a fire, for example, is depicted by the darkened data points. The visual representation generally corresponds with the confines of a building as shown in FIG. 14. The position of the darkened data points correspond with rack 1 and a sensor of the control system 50 in the room with rack 1 is shown to indicate an alert. In one embodiment, the user interface of FIG. 14 also indicates a list of possible fire sources determined and displayed based on the data received from a device/control unit 52 of a detector system 20 of building C1. In one or more embodiments, the status of multiple devices can be depicted along with their statuses such as connected, disconnected, alert, and alarm, for example. Notifications based on the determinations made from the data received from the networked devices can be transmitted to one or more of the detection systems 20 and/or one or more other computers or mobile devices.

Figure 15:
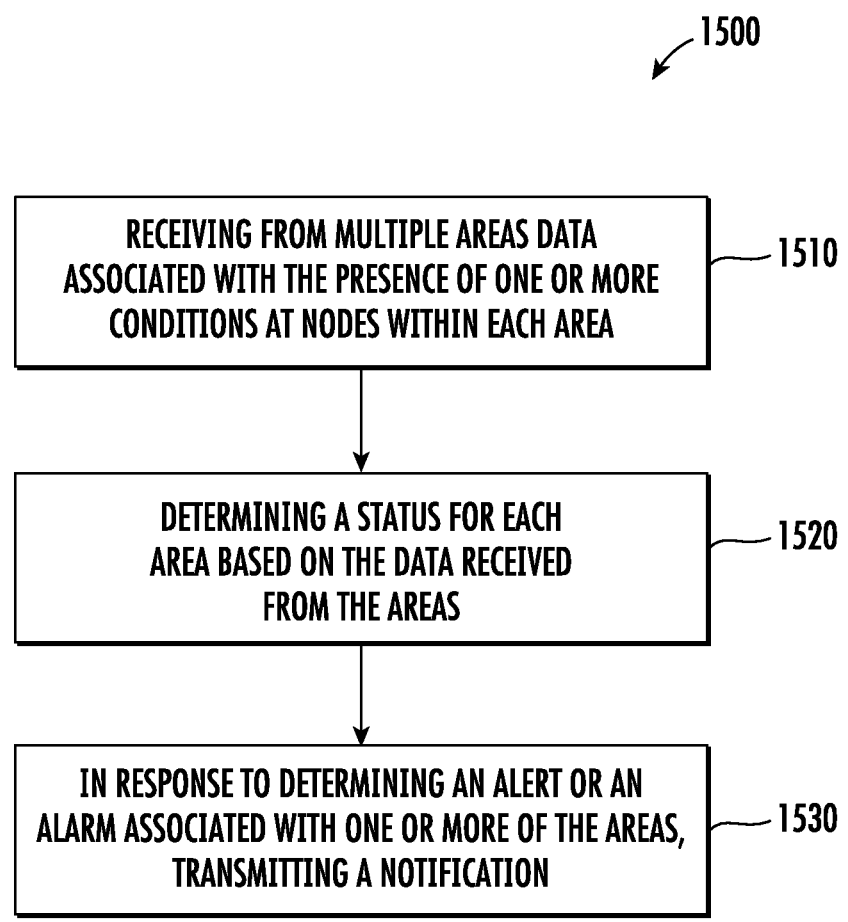
FIG. 15 is a flow diagram illustrating a method for measuring conditions within multiple areas according to one or more embodiments.

Turning to FIG. 15, one or more embodiments may include a method 1500 for measuring conditions within multiple areas. The flow diagram of FIG. 15 illustrates a computer-implemented method 1500 that includes block 1510 for receiving from multiple areas data associated with the presence of one or more conditions at a plurality of nodes within each area, wherein the data received from each area comprises a signal including scattered light and time of flight information associated with a corresponding plurality of nodes. The computer-implemented method then includes block 1520 for determining a status for each area based on the data received from the areas. The computer-implemented method also includes block 1530 for transmitting a notification in response to determining an alert or an alarm associated with one or more of the areas.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the disclosure has been described in detail in connection with only a limited number of embodiments, it should be readily understood that the disclosure is not limited to such disclosed embodiments. Rather, the invention can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A computer-implemented method for measuring conditions within multiple areas, the method comprising:
    receiving from multiple areas data associated with the presence of one or more conditions at a plurality of nodes within each area, wherein the data received from each area comprises a signal including scattered light and time of flight information associated with a corresponding plurality of nodes;
    determining a status for each area based on the data received from the areas; and
    in response to determining an alert or an alarm associated with one or more of the areas, transmitting a notification;
    wherein the data received from each area comprises an accumulated data stream wherein the accumulated data stream comprises a nuisance discrimination ratio determined by dividing a polarization vertical laser signal and a polarization horizontal laser signal.

2. The computer-implemented method of claim 1 wherein each area corresponds with a different room within a building.

3. The computer-implemented method of claim 1 wherein each area corresponds with a different room within different buildings.

4. The computer-implemented method of claim 1 wherein the data from each area is received from a control system for each area.

5. The computer-implemented method of claim 1 wherein transmitting a notification comprises transmitting at least one of an alert and an alarm.

6. The computer-implemented method of claim 1 wherein transmitting a notification comprises transmitting a source location and at least one of an alert and an alarm.

7. The computer-implemented method of claim 1 wherein transmitting a notification comprises transmitting a source location.

8. A computer-implemented method for measuring conditions within multiple areas, the method comprising:
    receiving from multiple areas data associated with the presence of one or more conditions at a plurality of nodes within each area, wherein the data received from each area comprises a signal including scattered light and time of flight information associated with a corresponding plurality of nodes;
    determining a status for each area based on the data received from the areas; and
    in response to determining an alert or an alarm associated with one or more of the areas, transmitting a notification;
    wherein the data received from each area comprises an accumulated data stream and wherein the accumulated data stream comprises polarization horizontal and vertical laser signals from a primary node and red and green collimating signals from a collimating node.

9. A computer-implemented method for measuring conditions within multiple areas, the method comprising:
    receiving from multiple areas data associated with the presence of one or more conditions at a plurality of nodes within each area, wherein the data received from each area comprises a signal including scattered light and time of flight information associated with a corresponding plurality of nodes;
    determining a status for each area based on the data received from the areas; and
    in response to determining an alert or an alarm associated with one or more of the areas, transmitting a notification;
    wherein the data received from at least one area comprises a localization spatial index identifying a location of a fire or pollutant within the at least one area.

10. The computer-implemented method of claim 1 further comprising displaying a user interface indicating a plurality of devices within one or more facilities and a status for each of the plurality of devices.

11. The computer-implemented method of claim 1 further comprising displaying a user interface, wherein the user interface comprises a source location and a status of one or more corresponding devices.

12. The computer-implemented method of claim 1 embodied in a cloud computing environment.

13. A computer program product comprising a computer readable storage medium having program instructions embodied therewith, the program instructions executable by a computer processor to cause the computer processor to perform a method for measuring conditions within multiple areas, comprising:
- receiving from multiple areas data associated with the presence of one or more conditions at a plurality of nodes within each area, wherein the data received from each area comprises a signal including scattered light and time of flight information associated with a corresponding plurality of nodes;
- determining a status for each area based on the data received from the areas; and
- in response to determining an alert or an alarm associated with one or more of the areas, transmitting a notification;
- wherein the data received from each area comprises an accumulated data stream wherein the accumulated data stream comprises a nuisance discrimination ratio determined by dividing a polarization vertical laser signal and a polarization horizontal laser signal.

14. The computer program product of claim 13 wherein transmitting a notification comprises transmitting a source location, an alert, and an alarm.

15. The computer program product of claim 13 further comprising determining a source location and a plurality of possible fire sources based on the received data.

16. The computer program product of claim 13 further comprising indicating a source location and a plurality of possible fire sources based on the received data.

17. The computer program product of claim 13 further comprising displaying a user interface indicating a plurality of devices within one or more facilities and a status for each of the plurality of devices.

18. The computer program product of claim 13 further comprising displaying a user interface, wherein the user interface comprises a source location and a status of one or more corresponding devices.

19. The computer program product of claim 13 embodied in a cloud computing environment.

* * * * *